US006339673B1

(12) United States Patent
Rijckaert

(10) Patent No.: US 6,339,673 B1
(45) Date of Patent: Jan. 15, 2002

(54) RECORDING OF A TRICK PLAY SIGNAL IN A HELICAL SCAN TYPE RECORDING APPARATUS

(75) Inventor: Albert M. A. Rijckaert, Eindhoven (NL)

(73) Assignee: U. S. Philips Corporation, New York, NY (US)

( * ) Notice: Subject to any disclaimer, the term of this patent is extended or adjusted under 35 U.S.C. 154(b) by 0 days.

(21) Appl. No.: 09/155,722

(22) PCT Filed: Feb. 2, 1998

(86) PCT No.: PCT/IB98/00135

§ 371 Date: Oct. 5, 1998

§ 102(e) Date: Oct. 5, 1998

(87) PCT Pub. No.: WO98/34228

PCT Pub. Date: Aug. 6, 1998

(30) Foreign Application Priority Data

| Feb. 3, 1997 | (EP) | 97200278 |
| Feb. 13, 1997 | (EP) | 97200402 |
| Feb. 28, 1997 | (EP) | 97200604 |

(51) Int. Cl.$^7$ .............................................. H04N 5/91
(52) U.S. Cl. ....................................... 386/81; 386/124
(58) Field of Search ............................. 386/6, 7, 8, 40, 386/68, 69, 74, 81, 124

(56) References Cited

U.S. PATENT DOCUMENTS

| 5,684,915 | A | * | 11/1997 | Ueda et al. ................... 386/124 |
| 5,978,542 | A | * | 11/1999 | Ting et al. ...................... 386/68 |
| 6,097,877 | A | * | 8/2000 | Katayama et al. ............. 386/68 |
| 6,108,148 | A | * | 8/2000 | Higurashi et al. ............. 386/68 |
| 6,115,532 | A | * | 9/2000 | Saeki ........................... 386/68 |
| 6,118,922 | A | * | 9/2000 | Van Gestel et al. ........... 386/68 |
| 6,141,485 | A | * | 10/2000 | Shinohara et al. ............. 386/68 |
| 6,141,486 | A | * | 10/2000 | Lane et al. .................... 386/68 |

* cited by examiner

Primary Examiner—Wendy R. Garber
Assistant Examiner—Polin Chieu
(74) Attorney, Agent, or Firm—Edward W. Goodman

(57) ABSTRACT

A recording apparatus records an MPEG information signal and a trick play signal in tracks on a record carrier (1). The trick play signal is meant for reproduction in a corresponding reproduction apparatus at a record carrier trick play speed which is $n_1$ times the nominal reproduction speed. Time stamps are added to the packets included in the trick play signal, and sync block numbers are added to the sync blocks including a packet, and the sync blocks are recorded at specific positions in the tracks. A specific algorithm is provided to determine those positions, dependent of the time stamps, and the sync block numbers given, such that upon reproduction at the trick play speed, the reproduction apparatus requires a buffer memory of a limited capacity.

14 Claims, 17 Drawing Sheets

RECORDING OF A TRICK PLAY SIGNAL IN A HELICAL SCAN TYPE RECORDING APPARATUS

BACKGROUND OF THE INVENTION

1. Field of The Invention

The invention relates to an apparatus for recording a digital information signal in tracks on a record carrier, the digital information signal being an information signal comprising subsequent transport packets of information, the apparatus comprising:

input means for receiving the digital information signal, signal processing means for processing the digital information signal so as to make the digital information signal suitable for recording in said tracks, the signal processing means being adapted (a) to generate sync blocks of information, each sync block comprising a first block section which comprises a synchronization signal and a second block section comprising a number of information bytes of the digital information signal, (b) to store, each time, the information included in x transport packets of the digital information signal in the second block sections of a group of y sync blocks, the second block section of at least the first sync block of the group of y sync blocks comprising a third block section for storing a time stamp, time stamp generator means for generating time stamps for packets of the digital information signal, and comprising counter means adapted to generate subsequent cycles of count values, sync block number generator means for generating sync block numbers for each of the sync blocks, and writing means for writing the sequence of sync blocks in the tracks on the record carrier, at a predetermined recording speed of the record carrier, the writing means comprising a rotatable head drum provided with at least a first and a second writing head, the digital information signal being meant for reproduction in a reproduction apparatus at a trick play speed which equals $n_1$ times said recording speed, where $n_1$ is an integer larger than 1.

2. Description of the Related Art

Such a recording apparatus is known from U.S. Pat. No. 5,579,183, document D1 in the List Of Related Documents. The known apparatus takes the form of a digital video recorder for recording a digital video signal. The digital video signal may be in the form of an MPEG-encoded video signal, in which packets of information of the digital video signal are included in the serial data stream of the MPEG-encoded video signal. In addition to such MPEG-encoded video signal, a trick play signal can be recorded in the tracks on the record carrier. Such trick play signal can be the same video signal, but reproduced at a record carrier (trick play) speed which is other than the nominal reproduction speed. Generally, a separate datastream is recorded as the trick play signal on the record carrier for enabling the reproduction at such trick play speed. The trick play signal can be derived from the MPEG-encoded video signal, e.g., by selecting I-frames from the MPEG-encoded video signal. The digital information signal defined hereunder in the claims is meant to be this trick play signal.

This trick play signal, however, need not necessarily be a trick play signal that has a relationship with the MPEG-encoded video signal, but can be a completely different signal. But, in the same way as the MPEG-encoded digital video signal, the serial datastream of the trick play signal comprises packets of information of the trick play signal.

The document mentioned above describes the inclusion of time stamps in the packets in all the serial datastreams recorded on the record carrier, in order to enable a correct regeneration of the serial datastream of packets, with the correct mutual timing relationships between the subsequent packets in the serial datastream, so that a correct decoding in an MPEG decoder will be possible. In order to realize this, the reproducing apparatus for reproducing an MPEG-encoded information signal includes a buffer memory in which the packets read from the record carrier are stored. The packets are retrieved from this buffer memory in response to the time stamps included in each packet for further processing in the MPEG decoder.

SUMMARY OF THE INVENTION

It is an object of the invention to provide an improved recording apparatus for recording a trick play signal, so that the buffer memory in the reproducing apparatus for reproducing a trick play signal can have a limited size.

The recording apparatus in accordance with the invention is characterized in that the time stamp generator means is adapted to generate subsequent time stamps in the form of subsequent cycles of (n'+k')-bit count values, where n' and k' are integers larger than zero, a cycle of count values coinciding in time with the time interval equal to $m_1$ revolutions of the head drum, the signal processing means being adapted to store a portion of a transport packet having a specific time stamp in a sync block having a specific sync block number, such that the said specific sync block number satisfies the following relationship, $$NTPSB-q_1 < ATPSB < NTPSB+q_2,$$

where ATPSB is the specific sync block number included in the said sync block and NTPSB is a nominal sync block number, which has the following relationship with the said specific time stamp:

$$NTPSB=int[(k+n/N) \cdot q/M],$$

where k is the decimal value corresponding to the binary value of the k' most significant bits of the count value corresponding to the said specific time stamp and n is the decimal value corresponding to the binary value of the n' least significant bits of the count value of the said specific time stamp, N and M being positive integers and q being an integer for which holds q≧$q_1$+$q_2$.

The invention is based on the following recognition. Recording a trick play signal is done by recording segments of the information of the trick play signal in specific locations in groups of p tracks, such that upon reproduction in a trick play reproduction mode, where the record carrier speed equals $n_1$ times the nominal reproduction speed, this nominal reproduction speed equaling the recording speed, exactly those segments are read by the read heads of the reproduction apparatus. The sync blocks in such segments include sync block numbers that have no relationship to the positions in the tracks where they are recorded. The question is: where to record the sync blocks comprising a packet of information of the first digital signal, such that it will be available upon reproduction in the trick play reproduction mode at the $n_1$ times the nominal reproduction speed, at a time instant sufficiently in time for processing in the MPEG decoder, and not too long before this time, as in such case, the buffer memory may be too large.

In accordance with the invention, it has been realized that the packets are stored at such position in the tracks, in dependence of the time stamps generated for these packets and the sync block numbers given to the sync blocks in which those packets are stored, that a buffer memory of limited capacity suffices needed in the reproduction apparatus.

It should be noted that in a further aspect of the invention, for each trick play signal, the algorithm proposed is used for determining the exact positions of the sync blocks in the tracks, and thus their sync block numbers.

BRIEF DESCRIPTION OF THE DRAWINGS

These and other aspects of the invention will be apparent from and elucidated with reference to the embodiments described hereafter in the drawings, in which.

DESCRIPTION OF THE PREFERRED EMBODIMENTS

Figure 1:
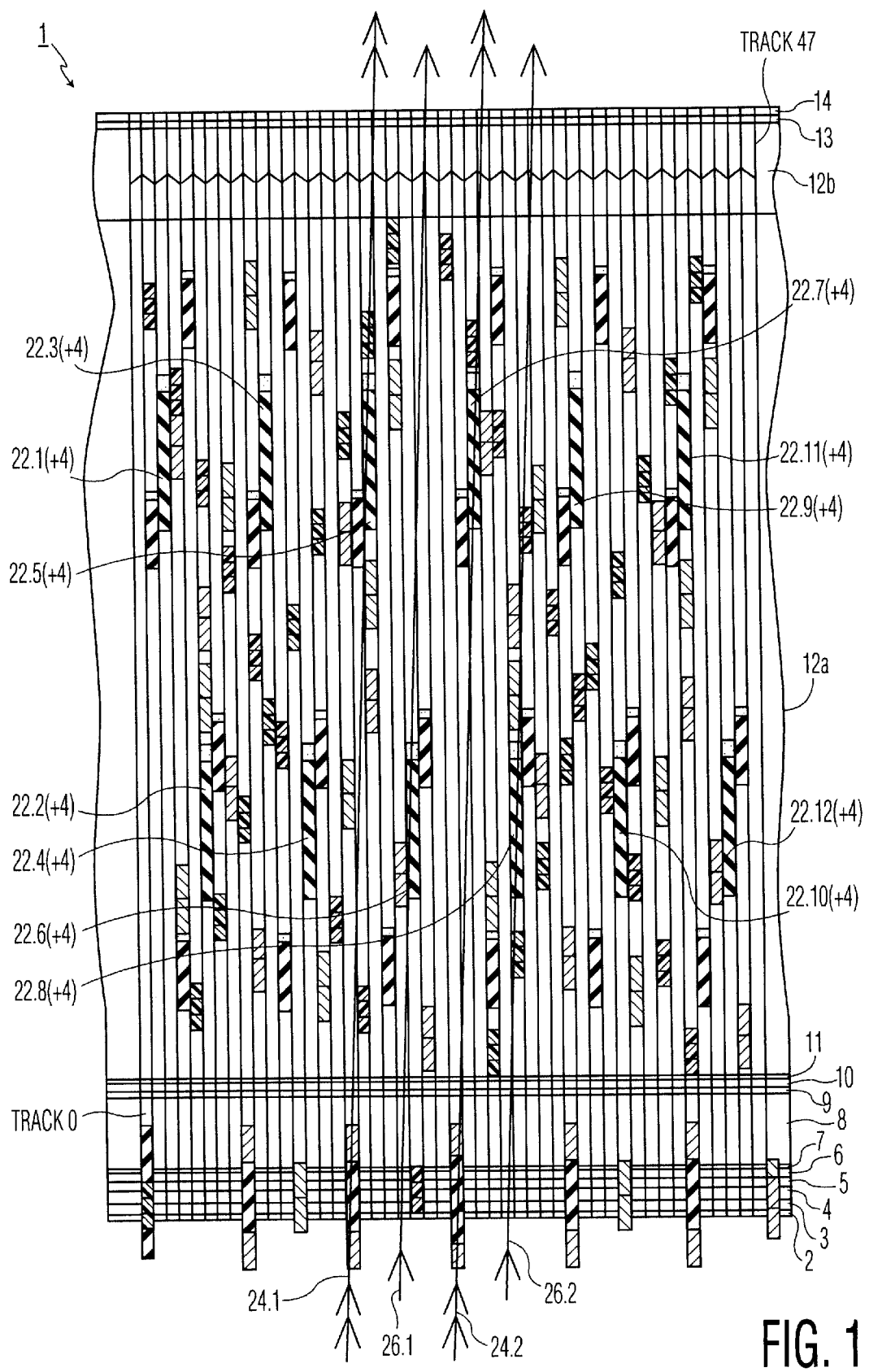
FIG. 1 shows the track format in a group of p tracks, where p equals 48, and the paths across the record carrier that two reproduction heads follow during a first trick play reproduction mode, where the record carrier speed is +4 times nominal.

FIG. 1 shows the track format of the tracks recorded on the record carrier 1. The tracks are recorded at a slant angle with reference to the longitudinal direction of the record carrier. In FIG. 1, however, the tracks are shown, for clarity reasons, at an angle transverse to the longitudinal direction of the record carrier 1. Groups of p successive tracks can be identified on the record carrier 1. One such group of p successive tracks is shown in FIG. 1, where p is in the present example equal to 48. During recording/reproduction, the tracks are written/read in a direction from the bottom to the top of FIG. 1 and from left to right in the figure.

Having subsequent groups of 48 tracks, the following dividends are possible as trick play speeds: 2x, 3x, 4x, 6x, 8x, 12x and 24x. The lowest two trick play speeds require a large amount of trick play data. Further, it is preferred to select trick play speeds that are integer multiples of each other. That results in either the trick play speeds 4x, 12x and 24x, or 6x, 12 and 24x. In the following, the set of trick play speeds 4x, 12x and 24x, and their reverse speeds will be further discussed.

Figure 2:
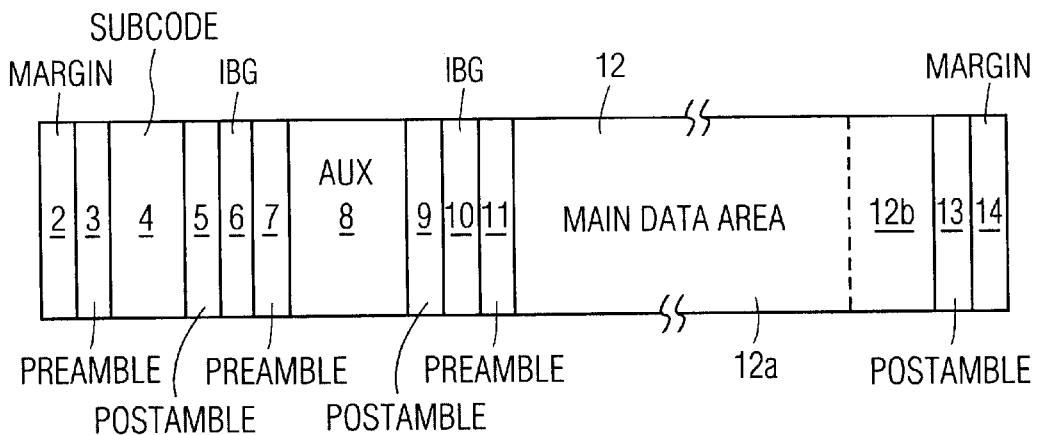
FIG. 2 shows the contents of a track on the record carrier.

FIG. 2 shows the format of one track. The track is recorded and read in a direction from left to right in the figure. In the present example, the lengths of the various track portions in FIG. 2 are expressed in number of main sync blocks, where a main sync block has a length of 112 bytes of 8 bits each.

First, a clock run-in portion 2, denoted 'margin', is recorded, which in the present example is 2 main sync blocks long. Next, a preamble portion 3 follows which is 3 main sync blocks long. A subcode signal recording portion 4 follows the preamble portion 3 and is 4 main sync blocks long. The subcode signal recording portion 4 is meant to contain a subcode signal. The subcode signal can comprise, among others, absolute and/or relative time information and a table of contents.

Next, a postamble portion 5 follows which is 3 main sync blocks long, an edit gap 6, denoted 'IBG', which is 3 main sync blocks long and a preamble portion 7, which is, in the present example, 1 main sync block long. Next, an auxiliary signal recording portion 8, denoted 'AUX', follows which is 23 main sync blocks long. The aux signal recording portion 8 is meant for recording an auxiliary signal, such as text data, as an example. This aux signal recording portion 8 is followed by a postamble portion 9, which is 2 main sync blocks long, an edit gap 10, denoted 'IBG', which is 3 main sync blocks long and a preamble portion 11, which is 1 main sync block long. Next, an information signal recording portion 12, denoted 'main data area', follows which is 307 main sync blocks long. The information signal recording portion 12 is meant to contain the digital information signals. One digital information signal can be a digital video signal and/or a digital audio signal, which may have been encoded into an MPEG information signal. Further, trick play data can be included in the information signal recording portion 12. The information signal recording portion 12 is fictively divided into two parts, a first part 12a which is 277 main sync blocks long, and a second part 12b, which is 30 main sync blocks long. The second part 12*b* comprise outer ECC parity information.

The information signal recording portion 12 is followed by a postamble portion 13, which is 2 main sync blocks long and another 'margin' portion 14, the length of which is not relevant, but can be assumed to be 2 main sync blocks long, for the present example. In total, the track thus comprises 356 main sync blocks.

It should be noted here, that the auxiliary signal recording portion 8 may be optional, in the sense that in another recording mode, no auxiliary signal is recorded in the tracks and the recording portion 8, including the portions 9, 10 and 11, are added to the information signal recording portion 12 and are filled with main information, however, without any trick play data.

Coming back to FIG. 1, the contents of the first part 12*a* of the information signal recording portion 12 will be further described. FIG. 1 shows tracks that have been recorded using at least a first and a second write head. The first write head has a gap with a first azimuth angle and the second write head has a gap with a second azimuth angle, which is different from the first azimuth angle. The tracks recorded by the first write head are indicated by the slant line running from the bottom left corner of the figure to the top right corner of the figure, and the tracks recorded by the second write head are indicated by the slant line running from the bottom right corner of the figure to the top left corner of the figure, see the circle in FIG. 1 having the reference numeral 20.

The first information signal, which may comprise packets of information of an MPEG transport stream, is recorded in the tracks, more specifically, in the information signal recording portions 12 of the tracks. In an embodiment of the recording apparatus, which is in the form of a digital videorecorder of the helical scan type, the first information signal could be 'normal play' data recorded in the tracks for reproduction in a reproducing apparatus at a record carrier speed which is the same as the record carrier speed during recording. This speed is defined as the nominal record carrier speed. The first information signal is accommodated in the main sync blocks, defined above.

Further, a second information signal has been recorded in specific segments in the tracks. Those segments are indicated in FIG. 1 by reference numerals 22.i(+4), where i runs from 1 to 12. This second information signal is meant for a reproduction in a reproduction apparatus at a reproduction speed which is 4 times the nominal reproduction speed in the forward direction. This second information signal could be an information signal which has no relationship whatsoever with the first information signal introduced above. Alternatively, the second information signal could have a relationship with the first information signal, in the sense that the second information signal is a trick play signal for the 4 times nominal reproduction speed, in order to obtain a reproduced (video) signal, which is a replica of the reproduced first (video) signal, but reproduced at four times the nominal speed in the forward direction.

Figure 1A:
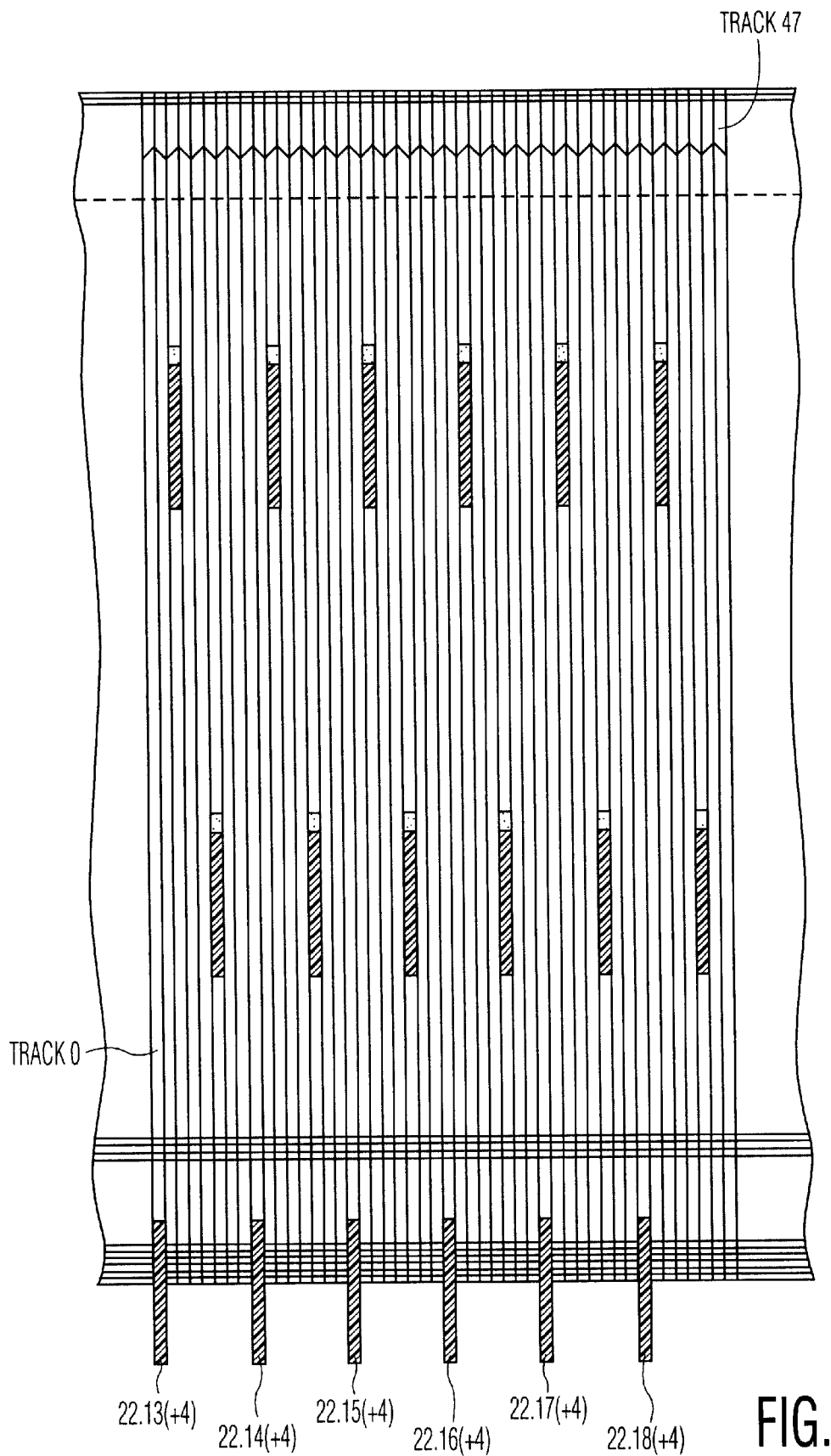
FIG. 1a shows the trick play segments for the +4 times nominal reproduction mode only, in the group of 48 tracks.

FIG. 1*a* shows the same group of 48 tracks as FIG. 1, however, only the 12 segments 22.i(+4) are shown in FIG. 1*a*. Assuming the track number of the first track in the group of 48 tracks to be track no. 0 and the track number of the last track in the group to be track number 47, the segments are recorded in the tracks with track number 2+n.8 and 5+n.8, where n is an integer running from 0 to 5 inclusive.

FIG. 1 further shows four scanning lines 24.1, 24.2, 26.1 and 26.2. The double-arrowed scanning lines 24.1 and 24.2 show the paths that the one read head, having the first azimuth angle, follows across the record carrier in the four times nominal reproduction mode, during two revolutions of the head drum. The single-arrowed scanning lines 26.1 and 26.2 show the paths that the other read head, having the second azimuth angle, follows across the record carrier in the four times nominal reproduction mode during the said two revolutions of the head drum. As can be seen in FIG. 1, the one read head reads the trick play segments 22.i(+4), where i is odd, and the other read head thus reads the trick play segments 22.i(+4),.where i is even.

The trick play segments 22.i(+4) each have a length of $(m_1/2=)$ 50 main sync blocks, in the present example. From the 50 main sync blocks in one segment, 45 sync blocks have information contents as regards the trick play information stored in those sync blocks, which could include 'dummy' sync blocks, to be described later. The other five sync blocks in a segment comprise parity information, obtained from an ECC encoding step carried out on the trick play information. Thus, during each revolution of the head drum, during a four times nominal reproduction mode, 100 sync blocks of information of the second information signal, which include 10 sync blocks comprising parity information are read from the record carrier.

When numbering the main sync blocks in a track, starting from 0, which is the first sync block in the aux recording area 8 in the track, until 305, which is the last sync block in the area 12*a* of the track, the sync blocks in the segments 22.i(+4), where i is even, are the sync blocks numbered 87 to 136 inclusive in a track, where the sync blocks numbered 132 to 136 inclusive are the sync blocks comprising the parity information. Further, the sync blocks in the segments 22.i(+4), where i is odd, are the sync blocks numbered 206 to 255 inclusive in a track, where, again, the sync blocks numbered 251 to 255 inclusive are the sync blocks comprising the parity information. It should be noted here, that what is called here as 'sync block numbers' for the trick play sync blocks, those numbers are numbers different from what is later called and described as 'trick play sync block numbers' for the same trick play sync blocks.

FIG. 1*a* further shows portions, numbered 22.13(+4) to 22.18(+4), located at the lower edge of some of the tracks in the group of 48 tracks. Those locations are locations that can be read in the +4 times nominal reproduction mode by one of the two read heads, in the present case, the read head having the first azimuth. As the locations shown include the subcode signal recording portion, it is possible to read the information in the subcode signal recording portion, also in the +4 times nominal reproduction mode.

Figure 3:
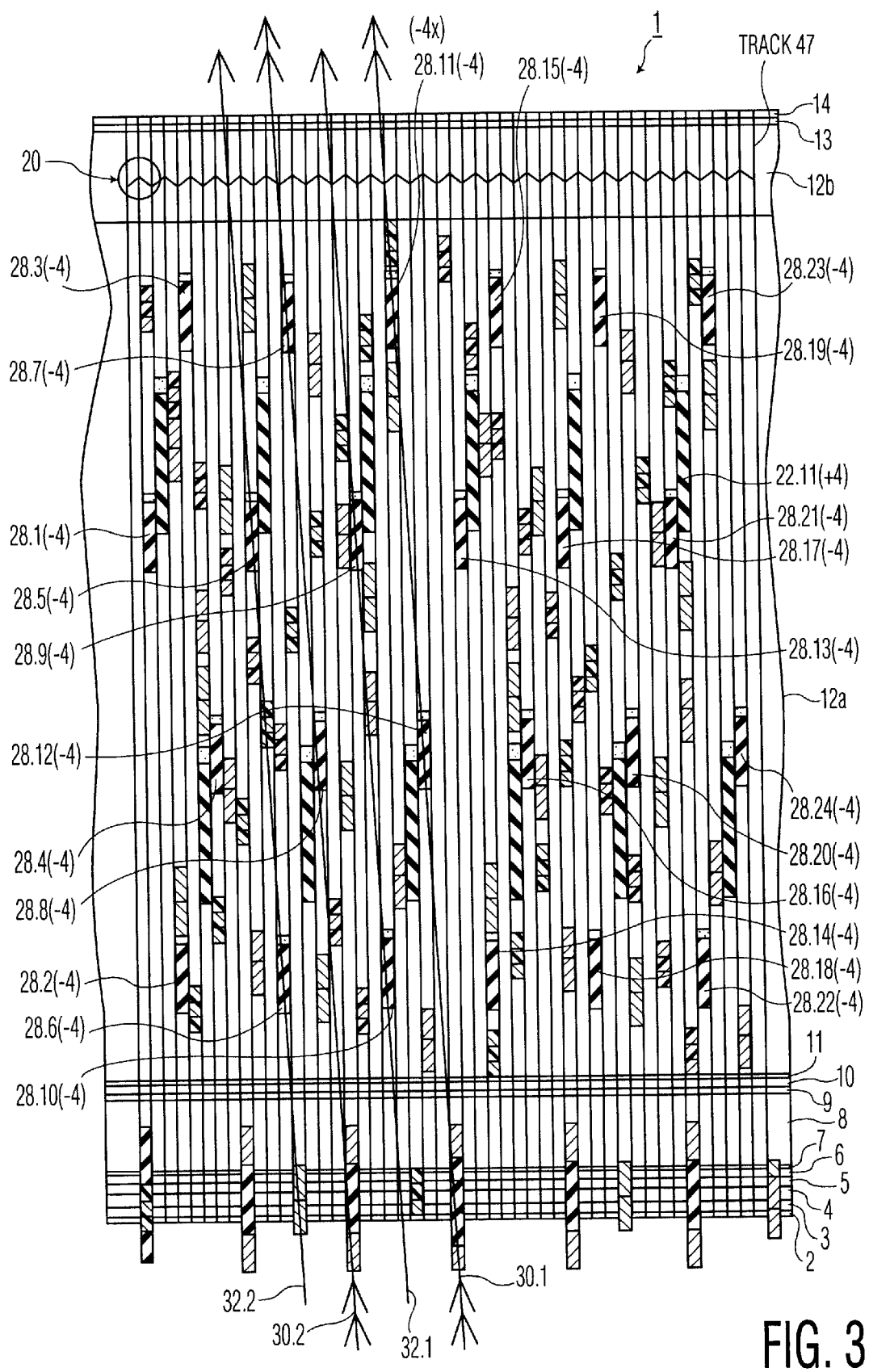
FIG. 3 shows the same format as FIG. 1, with the paths across the record carrier that the two reproduction heads follow during a second trick play reproduction mode, where the record carrier speed is −4 times nominal.

FIG. 3 shows a third information signal being recorded in specific segments in the tracks. Those segments are indicated in FIG. 3 by reference numerals 28.i(−4), where i runs from 1 to 24. This third information signal is meant for a reproduction in a reproduction apparatus at a reproduction speed which is 4 times the nominal reproduction speed in the backwards direction. This third information signal could be an information signal which has no relationship whatsoever with the first and/or the second information signal introduced above. Alternatively, the third information signal could have a relationship with the first information signal, in the sense that the third information signal is a trick play signal for the minus 4 times nominal reproduction speed, in order to obtain a reproduced (video) signal, which is a replica of the reproduced first (video) signal, but reproduced at minus four times the nominal speed (in the backwards direction).

Figure 3A:
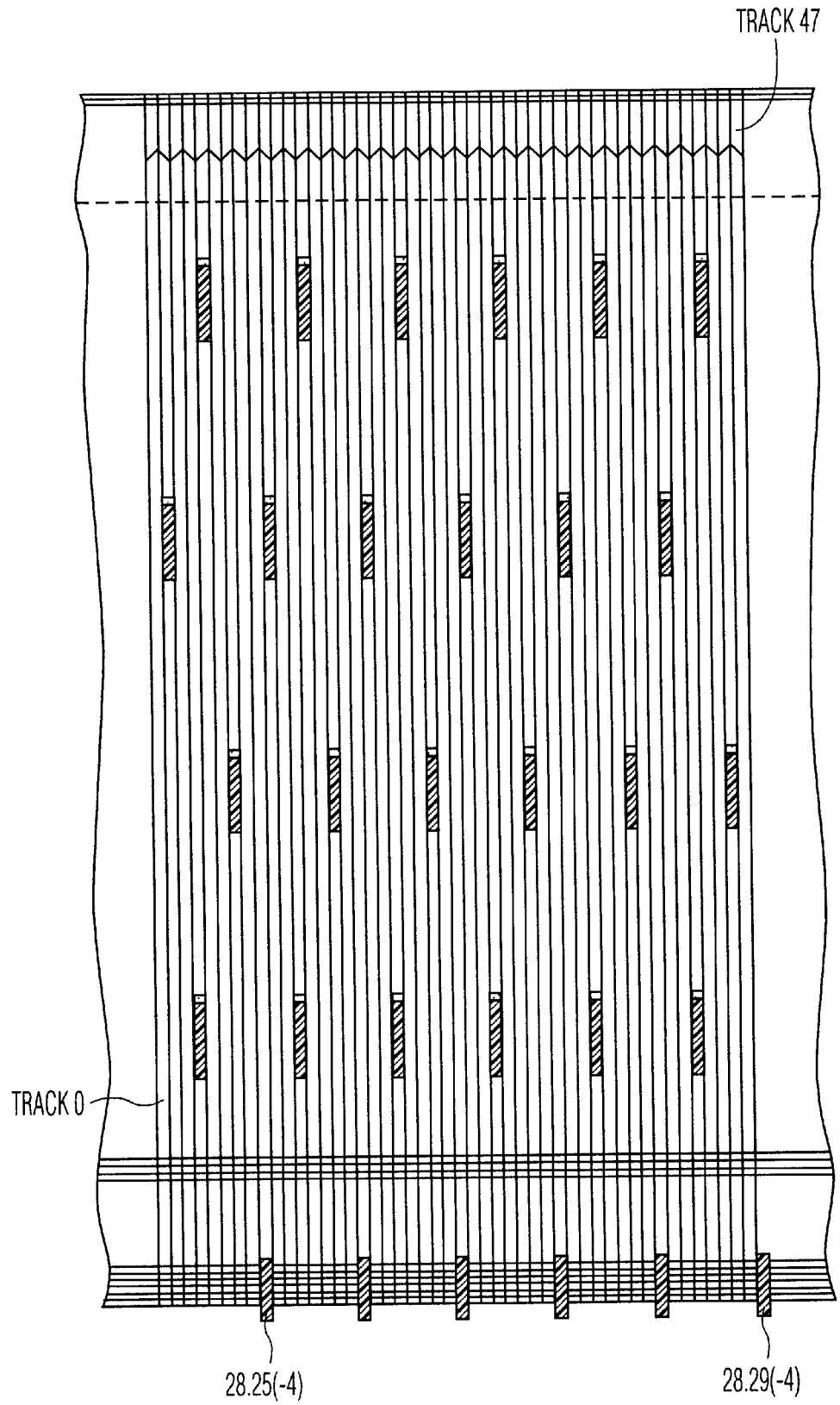
FIG. 3a shows the trick play segments for the −4 times nominal reproduction mode only, in the group of 48 tracks.

FIG. 3*a* shows the same group of 48 tracks as FIG. 3, however, only the 24 segments 28.i(−4) are shown in FIG.

3a. Assuming the track number of the first track in the group of 48 tracks to be track no. 0 and the track number of the last track in the group to be track number 47, the segments are recorded in the tracks with track number 1+n.8, 3+n.8, 4+n.8 and 6+n.8, where n is an integer running from 0 to 5 inclusive.

FIG. 3 further shows four scanning lines 30.1, 30.2, 32.1 and 32.2. The double-arrowed scanning lines 30.1 and 30.2 show the paths that the one read head, having the first azimuth angle, follows across the record carrier in the minus four times nominal reproduction mode, during two revolutions of the head drum. The single-arrowed scanning lines 32.1 and 32.2 show the paths that the other read head, having the second azimuth angle, follows across the record carrier in the minus four times nominal reproduction mode during the said two revolutions of the head drum. As can be seen in FIG. 3, the one read head reads the trick play segments 28.i(−4), where i equals 3, 4, 7, 8, 11, 12, 15, 16, 19, 20, 23 and 24, and the other read head thus reads the trick play segments 28.j(−4), where j equals 1, 2, 5, 6, 9, 10, 13, 14, 17, 18, 21 and 22.

The trick play segments 28.i(−4) each have a length of ($m_1$/4=) 25 main sync blocks. A trick play segment for the minus four times trick play speed comprises either 22 sync blocks having information contents as regards the trick play information stored in those sync blocks, and three sync blocks of parity information, or 23 sync blocks having each information contents as regards the trick play information stored in those sync blocks, and two sync blocks of parity information. Again, the parity information stored in the sync blocks comprising the parity information is obtained from an ECC encoding step carried out on the trick play signal.

The trick play segments for the minus 4 times nominal reproduction speed can be realized as explained in the following example. When numbering the main sync blocks, starting from 0, which is the first sync block in the aux recording area 8 in a track, until 305, which is the last sync block in the area 12a in the track, the sync blocks in the segments 28.i(−4), where i equals 2, 6, 10, 14, 18 and 22, are the sync blocks numbered 51 to 75 inclusive in a track, where the sync blocks numbered 74 and 75 are the sync blocks comprising the parity information. Further, the sync blocks in the segments 28.j(−4), where j equals 4, 8, 12, 16, 20, and 24, are the sync blocks numbered 122 to 146 inclusive in a track, where the sync blocks numbered 145 and 146 are the sync blocks comprising the parity information. The sync blocks in the segments 28.k(−4), where k equals 1, 5, 9, 13, 17 and 21, are the sync blocks numbered 194 to 218 inclusive in a track, where the sync blocks numbered 216, 217 and 218 are the sync blocks comprising the parity information. Further, the sync blocks in the segments 28.l(−4), where l equals 3, 7, 11, 15, 19, and 23, are the sync blocks numbered 265 to 289 inclusive in a track, where the sync blocks numbered 287, 288 and 289 are the sync blocks comprising the parity information.

Thus, during each revolution of the head drum, during a minus four times nominal reproduction mode, 100 sync blocks of information of the third information signal (2×22+ 2×23+10 sync blocks) are read from the record carrier. This is the same number of trick play sync blocks as for the 4 times reproduction mode.

FIG. 3a further shows portions, numbered 28.25(−4) to 28.29(−4), located at the lower edge of some of the tracks in the group of 48 tracks. Those locations are locations that can be read in the −4 times nominal reproduction mode by one of the two read heads, in the present case, the read head having the first azimuth. As the locations shown include the subcode signal recording portion, it is possible to read the information in the subcode signal recording portion, also in the −4 times nominal reproduction mode.

Figure 4:
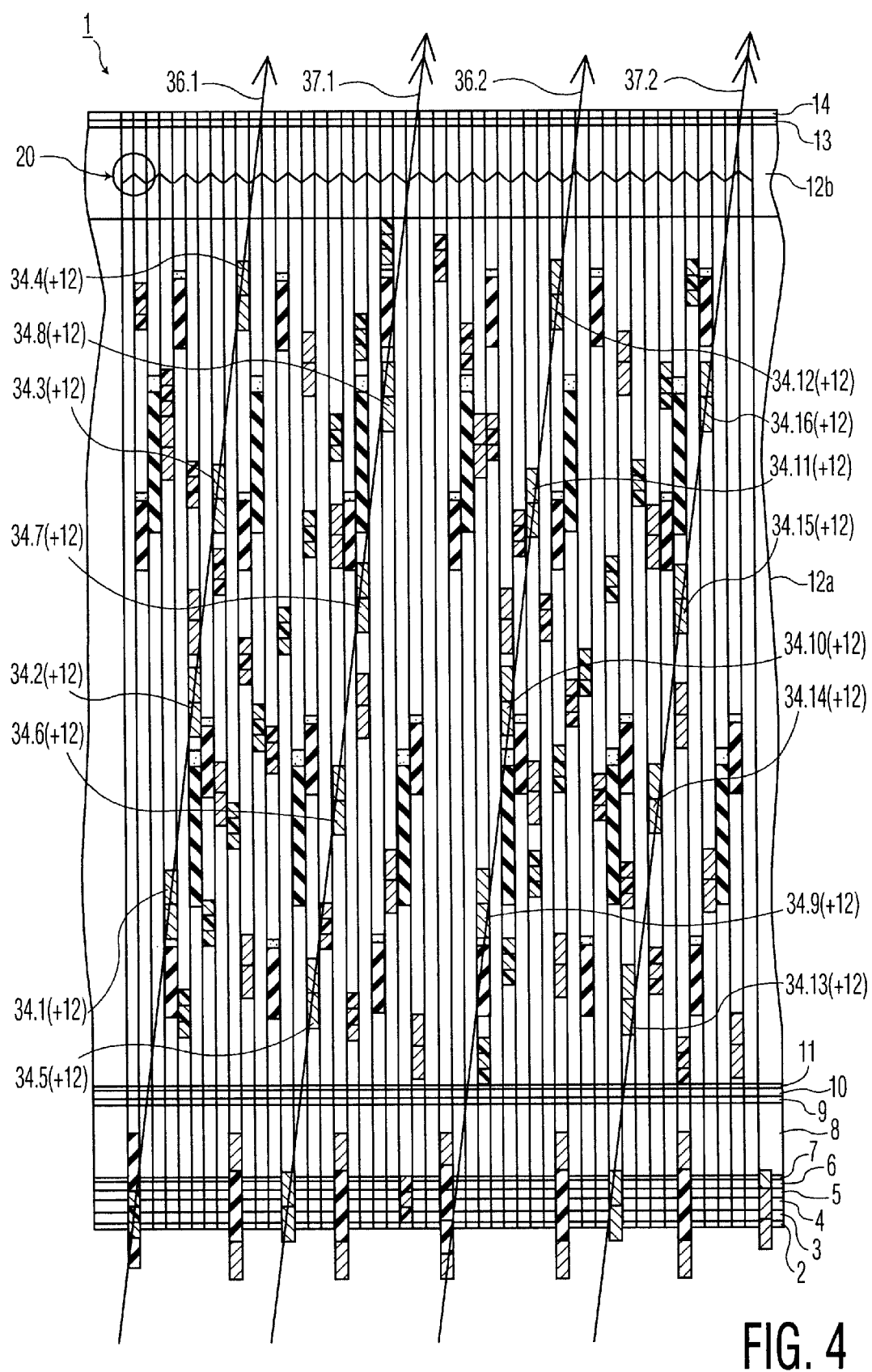
FIG. 4 shows the same format as FIG. 1, with the paths across the record carrier that the two reproduction heads follow during a third trick play reproduction mode, where the record carrier speed is +12 times nominal.

FIG. 4 shows a fourth information signal being recorded in specific segments in the tracks. Those segments are indicated in FIG. 4 by reference numerals 34.i(+12), where i runs from 1 to 16. This fourth information signal is meant for a reproduction in a reproduction apparatus at a reproduction speed which is 12 times the nominal reproduction speed in the forward direction. This fourth information signal could be an information signal which has no relationship whatsoever with the first and/or second and/or third information signal introduced above. Alternatively, the fourth information signal could have a relationship with the first information signal, in the sense that the fourth information signal is a trick play signal for the 12 times nominal reproduction speed in the forward direction, in order to obtain a reproduced (video) signal, which is a replica of the reproduced first (video) signal, but reproduced at 12 times the nominal speed (in the forward direction).

Figure 4A:
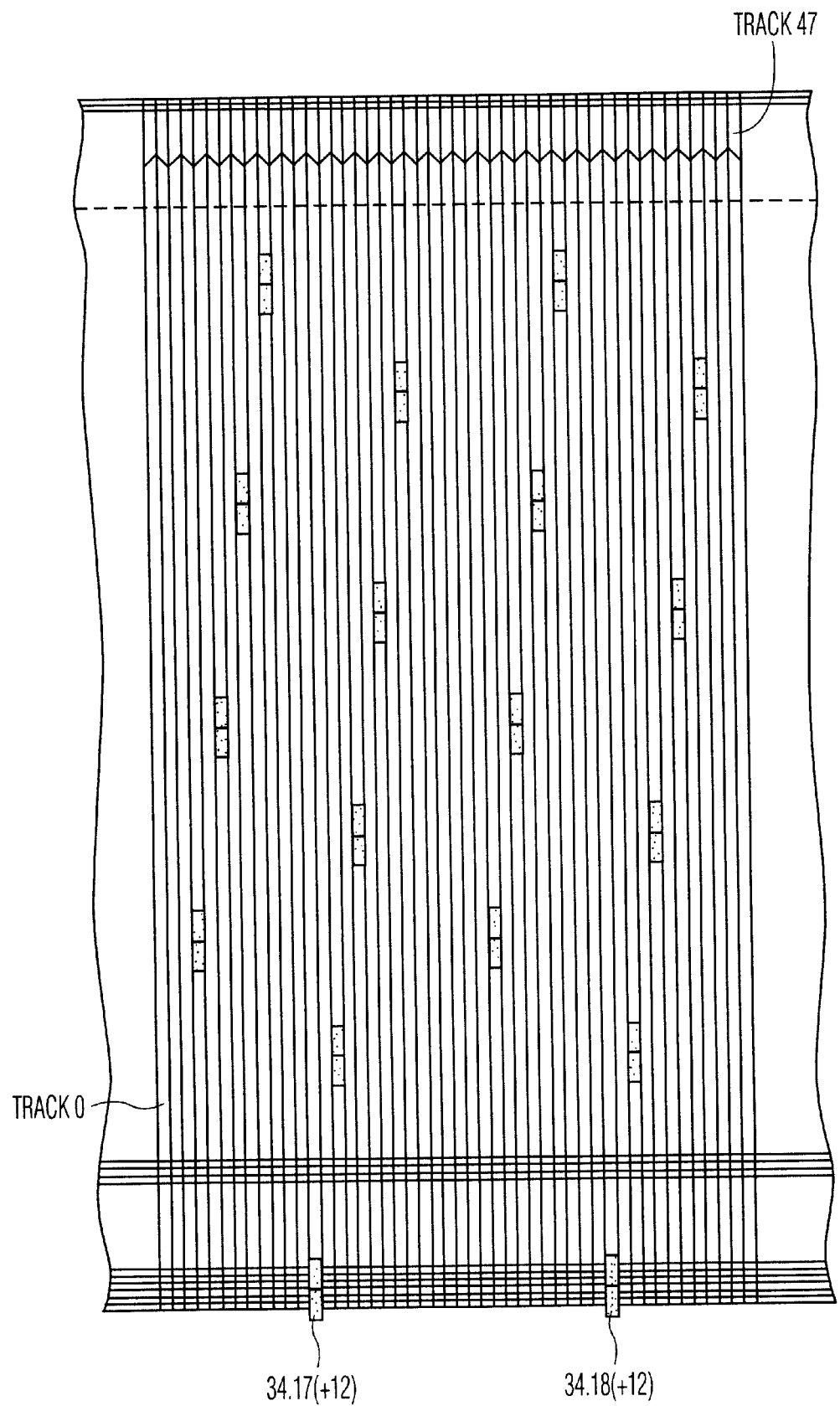
FIG. 4a shows the trick play segments for the +12 times nominal reproduction mode only, in the group of 48 tracks.

FIG. 4a shows the same group of 48 tracks as FIG. 4, however, only the 16 segments 34.i(+12) are shown in FIG. 4a. Assuming the track number of the first track in the group of 48 tracks to be track no. 0 and the track number of the last track in the group to be track number 47, the segments are recorded in the tracks with track number 3+n.2, 14+n.2, 27+n.2 and 38+n.2, where n is an integer running from 0 to 3 inclusive.

FIG. 4 further shows four scanning lines 36.1, 36.2, 37.1 and 37.2. The double-arrowed scanning lines 37.1 and 37.2 show the paths that the one read head, having the first azimuth angle, follows across the record carrier in the +12 times nominal reproduction mode, during two revolutions of the head drum. The single-arrowed scanning lines 36.1 and 36.2 show the paths that the other read head, having the second azimuth angle, follows across the record carrier in the +12 times nominal reproduction mode during the said two revolutions of the head drum. As can be seen in FIG. 4, the one read head reads the trick play segments 34.i(+12), where i equals 1 to 4 inclusive and 9 to 12 inclusive, and the other read head thus reads the trick play segments 34.j(+12), where j equals 5 to 8 inclusive and 13 to 16 inclusive.

There are trick play segments 34.i(+12) that have a length of ((m2−4)/8=) 22 main sync blocks and trick play segments 34.i(+12) that have a length of ((m2+12)/8=) 24 sync blocks. A trick play segment having a length of 22 sync blocks comprises 11 sync blocks having information contents as regards the trick play information stored in those sync blocks and further 11 sync blocks being a repetition of each of the 11 sync blocks. A trick play segment having a length of 24 sync blocks comprises 12 sync blocks having information contents as regards the trick play information stored in those sync blocks and further 12 sync blocks being a repetition of each of the 12 sync blocks.

The trick play segments for the +12 times nominal reproduction speed can be realized as explained in the following example. When, again, numbering the main sync blocks, starting from 0, which is the first sync block in the aux recording area 8 in a track, until 305, which is the last sync block in the area 12a in the track, the trick play sync blocks in the segments 34.1(+12| and 34.9(+12) are the sync blocks numbered 76 to 99 inclusive in a track, where the sync blocks numbered 88 to 99 inclusive are repetitions of the sync blocks numbered 76 to 87 inclusive. Further, the trick play sync blocks in the segments 34.2(+12) and 34.10(+12)

are the sync block numbered 141 to 162 inclusive in a track, where the sync blocks numbered 152 to 162 inclusive are repetitions of the sync blocks numbered 141 to 151 inclusive. The trick play sync blocks in the segments 34.3(+12) and 34.11(+12) are the sync blocks numbered 206 to 227 inclusive in a track, where the sync blocks numbered 217 to 227 inclusive are repetitions of the sync blocks numbered 206 to 216 inclusive. Further, the trick play sync blocks in the segments 34.4(+12) and 34.14(+12) are the sync blocks numbered 271 to 292 inclusive in a track, where the sync blocks numbered 282 to 292 inclusive are repetitions of the sync blocks numbered 271 to 281 inclusive.

The trick play sync blocks in the segments 34.5(+12) and 34.13(+12) are the sync blocks numbered 44 to 67 inclusive in a track, where the sync blocks numbered 56 to 67 inclusive are repetitions of the sync blocks numbered 44 to 55 inclusive. Further, the trick play sync blocks in the segments 34.6(+12) and 34.14(+12) are the sync blocks numbered 109 to 130 inclusive in a track, where the sync blocks numbered 120 to 130 inclusive are repetitions of the sync blocks numbered 109 to 119 inclusive. The trick play sync blocks in the segments 34.7(+12) and 34.15(+12) are the sync blocks numbered 174 to 195 inclusive in a track, where the sync blocks numbered 185 to 195 inclusive are repetitions of the sync blocks numbered 174 to 184 inclusive. Further, the trick play sync blocks in the segments 34.8(+12) and 34.16(+12) are the sync blocks numbered 239 to 260 inclusive in a track, where the sync blocks numbered 250 to 260 inclusive are repetitions of the sync blocks numbered 239 to 249 inclusive.

Thus, during each revolution of the head drum, during a +12 times nominal reproduction mode, 180 sync blocks (6×22+2×24 sync blocks) of the fourth information signal are read from the record carrier.

FIG. 4a further shows portions, numbered 34.17(+12) and 34.18(+12), located at the lower edge of some of the tracks in the group of 48 tracks. Those locations are locations that can be read in the +12 times nominal reproduction mode by one of the two read heads, in the present case, the read head having the first azimuth. As the locations shown include the subcode signal recording portion, it is possible to read the information in the subcode signal recording portion, also in the +12 times nominal reproduction mode.

Figure 5:
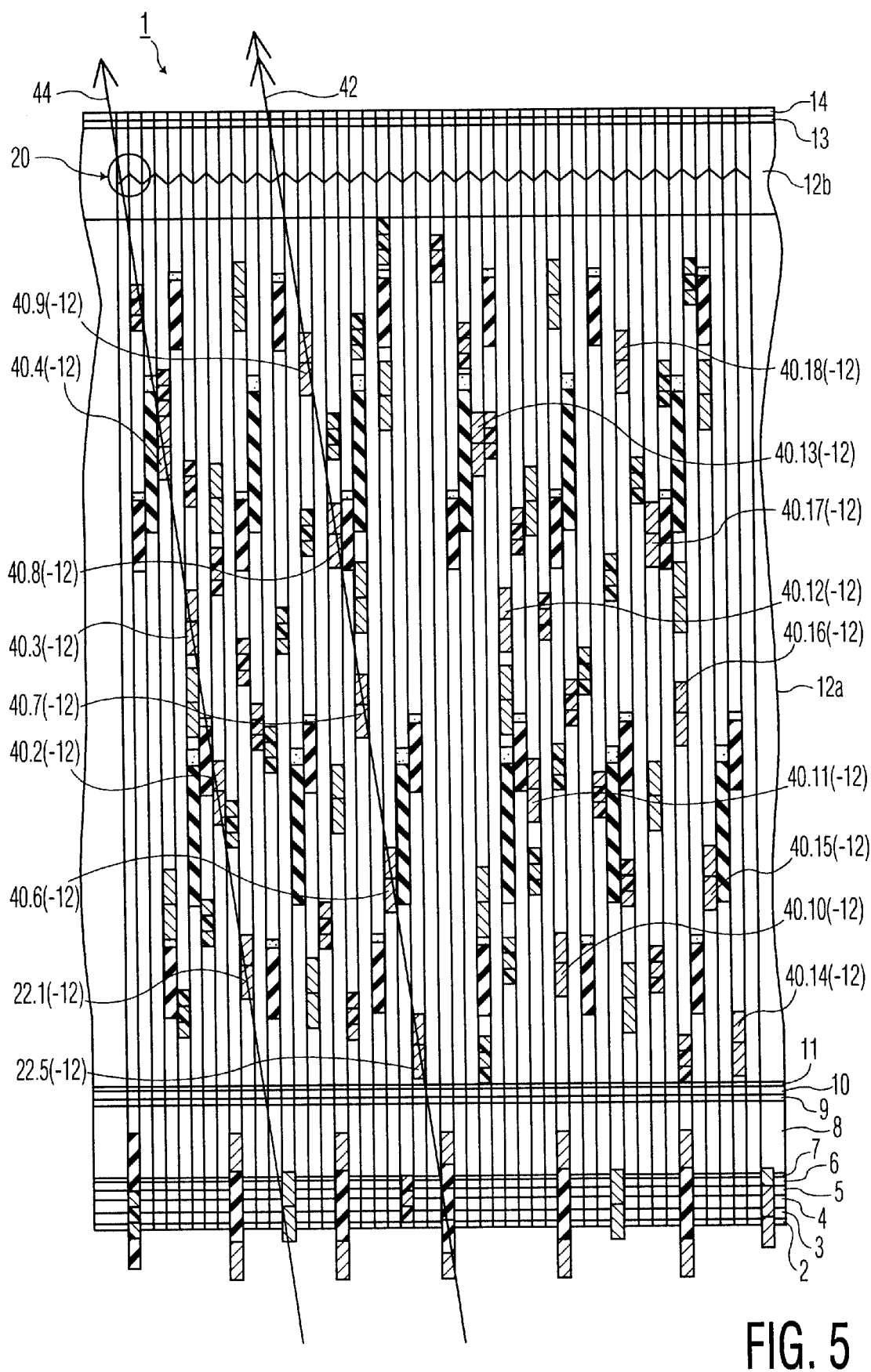
FIG. 5 shows the same format as FIG. 1, with the paths across the record carrier that the two reproduction heads follow during a fourth trick play reproduction mode, where the record carrier speed is −12 times nominal.

FIG. 5 shows a fifth information signal being recorded in specific segments in the tracks. Those segments are indicated in FIG. 5 by reference numerals 40.i(−12), where i runs from 1 to 18. This fifth information signal is meant for a reproduction in a reproduction apparatus at a reproduction speed which is minus 12 times the nominal reproduction speed (that is: in the backwards direction). This fifth information signal could be an information signal which has no relationship whatsoever with the first and/or second and/or third and/or fourth information signal introduced above. Alternatively, the fifth information signal could have a relationship with the first information signal, in the sense that the fifth information signal is a trick play signal for the minus 12 times nominal reproduction speed, in order to obtain a reproduced (video) signal, which is a replica of the reproduced first (video) signal, but reproduced at minus 12 times the nominal speed (in the backwards direction).

Figure 5A:
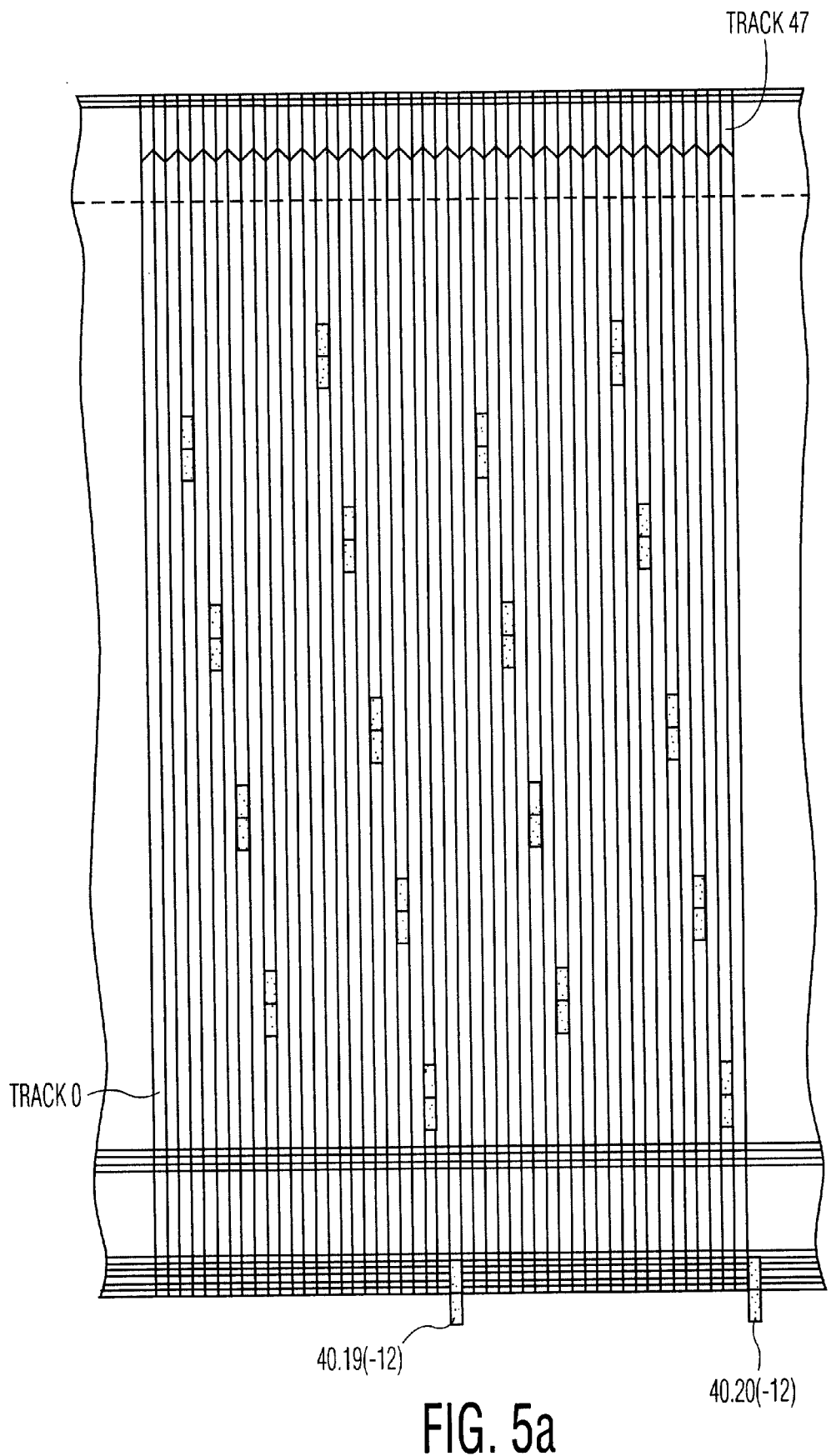
FIG. 5a shows the trick play segments for the −12 times nominal reproduction mode only, in the group of 48 tracks.

FIG. 5a shows the same group of 48 tracks as FIG. 5, however, only the 18 segments 40.i(−12) are shown in FIG. 5a. Assuming the track number of the first track in the group of 48 tracks to be track no. 0 and the track number of the last track in the group to be track number 47, the segments are recorded in the tracks with track number 3+n.2 and 27+n.2, where n is an integer running from 0 to 3 and in tracks with track numbers 14+n.2 and 38+n.2, where n is an integer running from 0 to 4 inclusive.

FIG. 5 further shows only two scanning lines 42 and 44 The double-arrowed scanning line 42 shows the path that the one read head, having the first azimuth angle, follows across the record carrier in the −12 times nominal reproduction mode, during one revolution of the head drum. The single-arrowed scanning line 44 shows the path that the other read head, having the second azimuth angle, follows across the record carrier in the −12 times nominal reproduction mode during the said one revolution of the head drum. As can be seen in FIG. 5, the one read head reads the trick play segments 40.i(−12), where i equals 5 to 9 inclusive (and also 14 to 18 inclusive), and the other read head thus reads the trick play segments 40.j(−12), where j equals 1 to 4 inclusive and 10 to 13 inclusive.

The trick play segments 40.i(−12) each have a length of 20 main sync blocks, where each trick play segment comprises 10 sync blocks having information contents as regards the trick play information stored in those sync blocks and further 10 sync blocks being a repetition of each of the 10 sync blocks.

The trick play segments for the −12 times nominal reproduction speed can be realized as explained in the following example. When, again, numbering the main sync blocks, starting from 0, which is the first sync block in the aux recording area 8 in a track, until 305, which is the last sync block in the area 12a in the track, the sync blocks in the segments 40.5(−12) and 40.14(−12) are the sync blocks numbered 30 to 49 inclusive in a track, where the sync blocks numbered 40 to 49 inclusive are repetitions of the sync blocks numbered 30 to 39 inclusive. Further, the sync blocks in the segments 40.1(−12) and 40.10(−12) are the sync blocks numbered 57 to 76 inclusive in a track, where the sync blocks numbered 67 to 76 inclusive are repetitions of the sync blocks numbered 57 to 66 inclusive. The sync blocks in the segments 40.6(−12) and 40.15(−12) are the sync blocks in a track numbered 85 to 104 inclusive, where the sync blocks numbered 95 to 104 inclusive are repetitions of the sync blocks numbered 85 to 94 inclusive. Further, the sync blocks in the segments 40.2(−12) and 40.11(−12) are the sync blocks in a track numbered 112 to 131 inclusive, where the sync blocks numbered 122 to 131 inclusive are repetitions of the sync blocks numbered 112 to 121 inclusive.

The sync blocks in the segments 40.7(−12) and 40.16(−12) are the sync blocks in a track numbered 139 to 158 inclusive, where the sync blocks numbered 149 to 158 inclusive are repetitions of the sync blocks numbered 139 to 148 inclusive. Further, the sync blocks in the segments 40.3(−12) and 40.12(−12) are the sync blocks in a track numbered 167 to 186 inclusive, where the sync blocks numbered 177 to 186 inclusive are repetitions of the sync blocks numbered 167 to 176 inclusive. The sync blocks in the segments 40.8(−12) and 40.17(−12) are the sync blocks in a track numbered 194 to 213 inclusive, where the sync blocks numbered 204 to 213 inclusive are repetitions of the sync blocks numbered 194 to 203 inclusive. Further, the sync blocks in the segments 40.4(−12) and 40.13(−12) are the sync blocks in a track numbered 222 to 241 inclusive, where the sync blocks numbered 232 to 241 inclusive are repetitions of the sync blocks numbered 222 to 231 inclusive. At last, the sync blocks in the segments 40.9(−12) and 40.18(−12) are the sync blocks in a track numbered 249 to 268 inclusive, where the sync blocks numbered 259 to 268 inclusive are repetitions of the sync blocks numbered 249 to 258 inclusive.

Thus, during each revolution of the head drum, during a −12 times nominal reproduction mode, 180 sync blocks (9×20 sync blocks) of information of the fifth information signal are read from the record carrier, which is the same number of sync blocks as for the +12x reproduction mode.

FIG. 5a further shows portions, numbered 40.19(−12) and 40.20(−12), located at the lower edge of some of the tracks in the group of 48 tracks. Those locations are locations that can be read in the −12 times nominal reproduction mode by one of the two read heads, in the present case, the read head having the first azimuth. As the locations shown include the subcode signal recording portion, it is possible to read the information in the subcode signal recording portion, also in the −12 times nominal reproduction mode.

Figure 6:
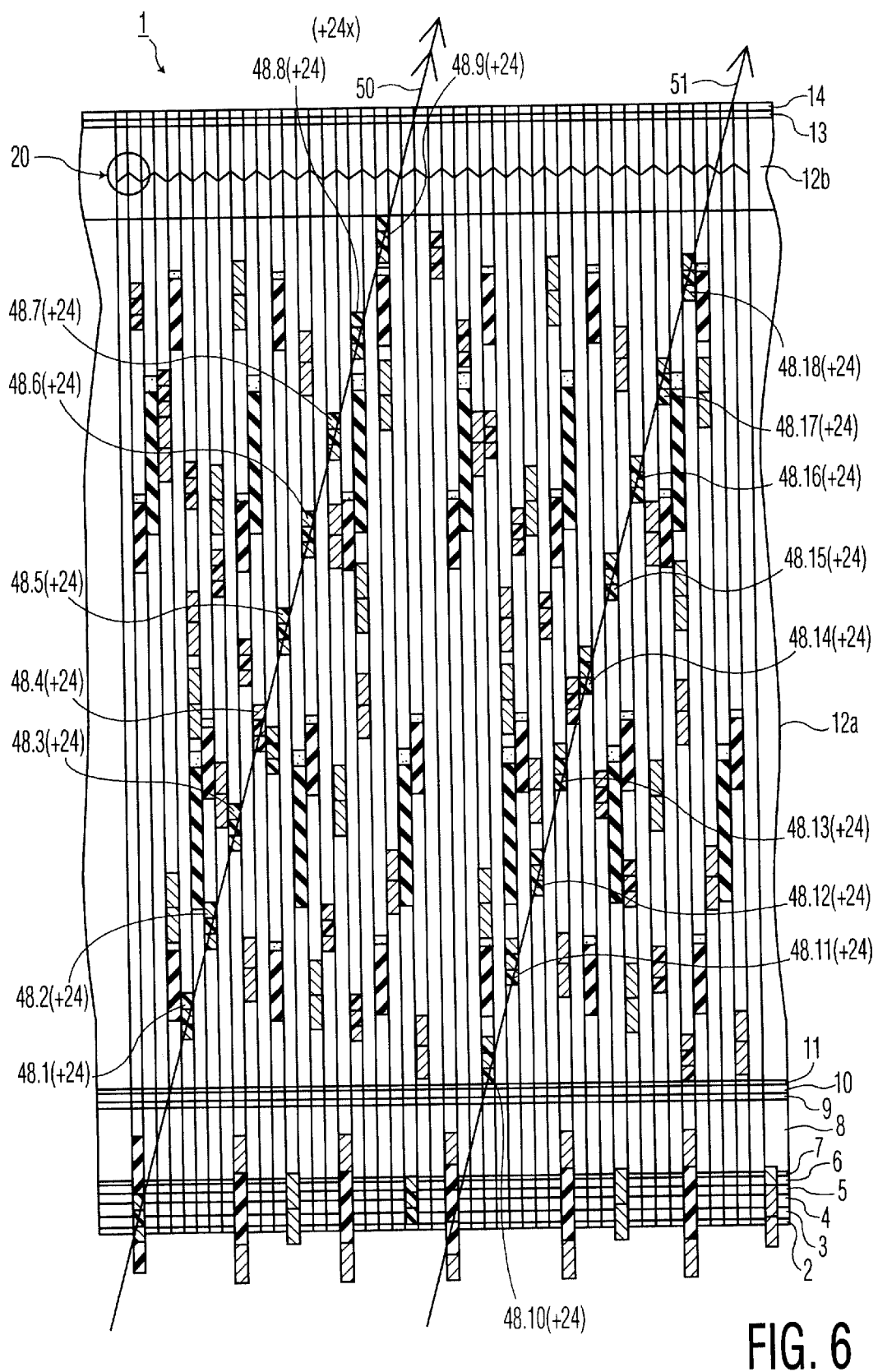
FIG. 6 shows the same format as FIG. 1, with the paths across the record carrier that the two reproduction heads follow during a fifth trick play reproduction mode, where the record carrier speed is +24 times nominal.

FIG. 6 shows a sixth information signal being recorded in specific segments in the tracks. Those segments are indicated in FIG. 6 by reference numerals 48.i(+24), where i runs from 1 to 18. This sixth information signal is meant for a reproduction in a reproduction apparatus at a reproduction speed which is +24 times the nominal reproduction speed (that is: in the forward direction). This sixth information signal could be an information signal which has no relationship whatsoever with the first and/or second and/or third and/or fourth and/or fifth information signal introduced above. Alternatively, the sixth information signal could have a relationship with the first information signal, in the sense that the sixth information signal is a trick play signal for the +24 times nominal reproduction speed, in order to obtain a reproduced (video) signal, which is a replica of the reproduced first (video) signal, but reproduced at +24 times the nominal speed.

Figure 6A:
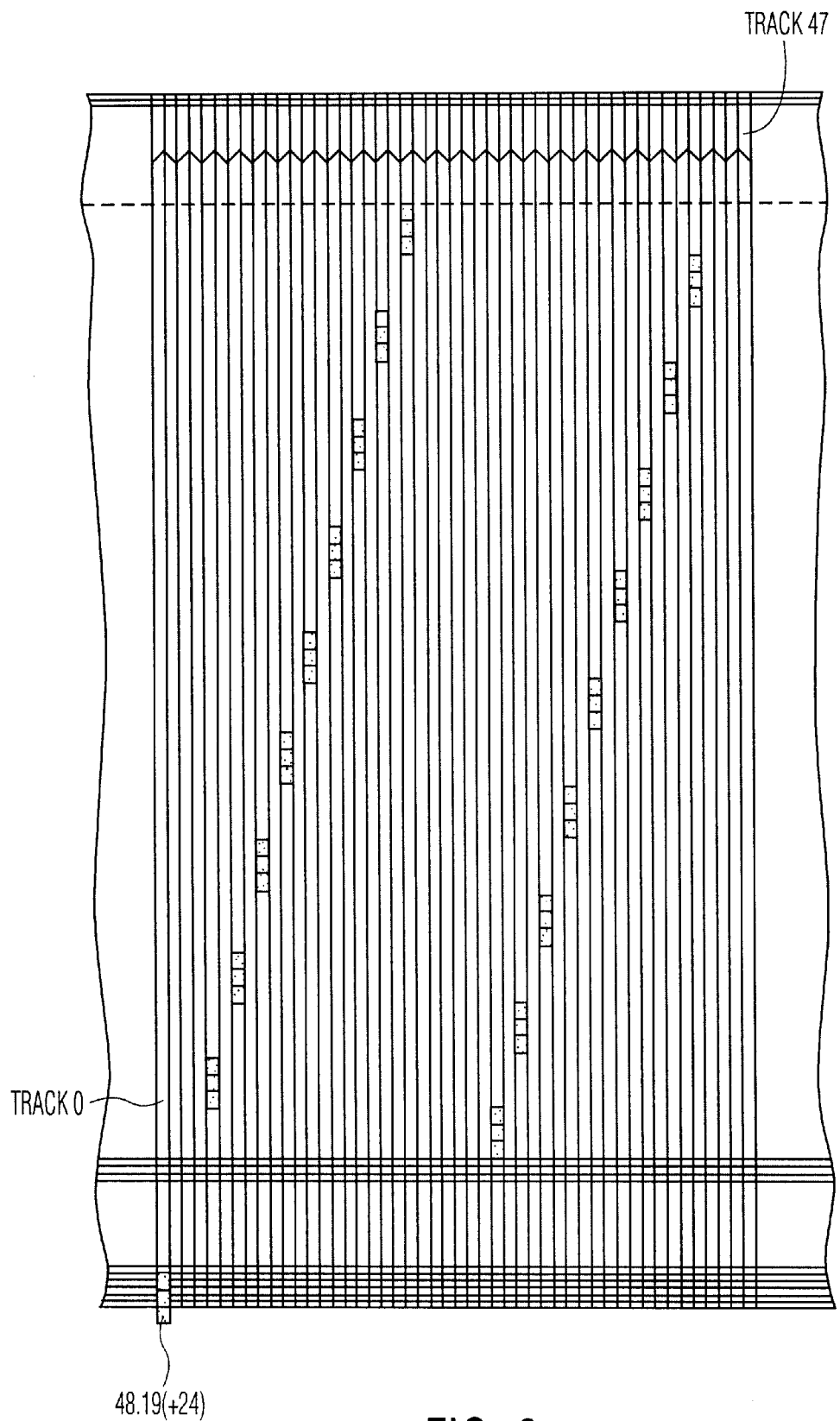
FIG. 6a shows the trick play segments for the +24 times nominal reproduction mode only, in the group of 48 tracks.

FIG. 6a shows the same group of 48 tracks as FIG. 6, however, only the 18 segments 48.i(+24) are shown in FIG. 6a. Assuming the track number of the first track in the group of 48 tracks to be track no. 0 and the track number of the last track in the group to be track number 47, the segments are recorded in the tracks with track number 4+n.2 and 27+n.2, where n is an integer running from 0 to 8 inclusive.

FIG. 6 further shows two scanning lines 50 and 51. The double-arrowed scanning line 50 shows the path that the one read head, having the first azimuth angle, follows across the record carrier in the +24 times nominal reproduction mode, during one revolution of the head drum. The single-arrowed scanning line 51 shows the path that the other read head, having the second azimuth angle, follows across the record carrier in the +24 times nominal reproduction mode during the said one revolution of the head drum. As can be seen in FIG. 6, the one read head reads the trick play segments 48.i(+24), where i equals 1 to 9 inclusive, and the other read head thus reads the trick play segments 48.j(+24), where j equals 10 to 18 inclusive.

The trick play segments 48.i(+24) each have a length of 15 main sync blocks, where each segment comprises 5 sync blocks having information contents as regards the trick play information stored in those sync blocks and further, those 5 sync blocks are each repeated twice.

The trick play segments for the +24 times nominal reproduction speed can be realized as explained in the following example. When, again, numbering the main sync blocks, starting from 0, which is the first sync block in the aux recording area 8 in a track, until 305, which is the last sync block in the area 12a in the track, the sync blocks in the segment 48.10(+24) are the sync blocks in a track numbered 29 to 43 inclusive, where the sync blocks numbered 34 to 38 inclusive and 39 to 43 inclusive are repetitions of the sync blocks 29 to 33 inclusive. The sync blocks in the segment 48.1(+24) are the sync blocks in a track numbered 43 to 57 inclusive, where the sync blocks numbered 48 to 52 inclusive and 53 to 57 inclusive are repetitions of the sync blocks numbered 43 to 47 inclusive. The sync blocks in the segment 48.11(+24) are the sync blocks in a track numbered 60 to 74 inclusive, where the sync blocks numbered 65 to 69 inclusive and 70 to 74 inclusive are repetitions of the sync blocks 60 to 64. The sync blocks in the segment 48.2(+24) are the sync blocks in a track numbered 74 to 88 inclusive, where the sync blocks numbered 79 to 83 inclusive and 84 to 88 inclusive are repetitions of the sync blocks numbered 74 to 78 inclusive. The sync blocks in the segment 48.12(+24) are the sync blocks in a track numbered 91 to 105 inclusive, where the sync blocks numbered 96 to 100 inclusive and 101 to 105 inclusive are repetitions of the sync blocks 91 to 95 inclusive. The sync blocks in the segment 48.3(+24) are the sync blocks in a track numbered 105 to 119 inclusive, where the sync blocks numbered 110 to 114 inclusive and the sync blocks 115 to 119 inclusive are repetitions of the sync blocks numbered 105 to 109 inclusive. Further, the sync blocks in the segment 48.13(+24) are the sync blocks in a track numbered 122 to 136 inclusive, where the sync blocks numbered 127 to 131 inclusive and 132 to 136 inclusive are repetitions of the sync blocks 122 to 126 inclusive. The sync blocks in the segment 48.4(+24) are the sync blocks in a track numbered 136 to 150 inclusive, where the sync blocks numbered 141 to 145 inclusive and the sync blocks 146 to 150 are repetitions of the sync blocks numbered 136 to 140 inclusive.

The sync blocks in the segment 48.14(+24) are the sync blocks in a track numbered 153 to 167 inclusive, where the sync blocks numbered 158 to 162 inclusive and the sync blocks numbered 163 to 167 inclusive are repetitions of the sync blocks numbered 153 to 157 inclusive. The sync blocks in the segment 48.5(+24) are the sync blocks in a track numbered 167 to 181 inclusive, where the sync blocks numbered 172 to 176 inclusive and 177 to 181 inclusive are repetitions of the sync blocks numbered 167 to 171 inclusive.

The sync blocks in the segment 48.15(+24) are the sync blocks in a track numbered 184 to 198 inclusive, where the sync blocks numbered 189 to 193 inclusive and the sync blocks numbered 194 to 198 inclusive are repetitions of the sync blocks numbered 184 to 188 inclusive. The sync blocks in the segment 48.6(+24) are the sync blocks in a track numbered 198 to 212 inclusive, where the sync blocks numbered 203 to 207 inclusive and 208 to 212 inclusive are repetitions of the sync blocks numbered 198 to 202 inclusive.

The sync blocks in the segment 48.16(+24) are the sync blocks in a track numbered 215 to 229 inclusive, where the sync blocks numbered 220 to 224 inclusive and the sync blocks numbered 225 to 229 inclusive are repetitions of the sync blocks numbered 215 to 219 inclusive. The sync blocks in the segment 48.7(+24) are the sync blocks in a track numbered 229 to 243 inclusive, where the sync blocks numbered 234 to 238 inclusive and 239 to 243 inclusive are repetitions of the sync blocks numbered 229 to 233 inclusive.

The sync blocks in the segment 48.17(+24) are the sync blocks in a track numbered 246 to 260 inclusive, where the sync blocks numbered 251 to 255 inclusive and the sync blocks numbered 256 to 260 inclusive are repetitions of the sync blocks numbered 246 to 250 inclusive. The sync blocks in the segment 48.8(+24) are the sync blocks in a track numbered 260 to 274 inclusive, where the sync blocks numbered 265 to 269 inclusive and 270 to 274 inclusive are repetitions of the sync blocks numbered 260 to 264 inclusive.

The sync blocks in the segment 48.18(+24) are the sync blocks in a track numbered 277 to 291 inclusive, where the sync blocks numbered 282 to 286 inclusive and the sync blocks numbered 287 to 291 inclusive are repetitions of the sync blocks numbered 277 to 281 inclusive. The sync blocks in the segment 48.9(+24) are the sync blocks in a track numbered 291 to 305 inclusive, where the sync blocks numbered 296 to 300 inclusive and 301 to 305 inclusive are repetitions of the sync blocks numbered 291 to 295 inclusive.

Thus, during each revolution of the head drum, during a +24 times nominal reproduction mode, 270 sync blocks (18×15 sync blocks) of information of the sixth information signal are read from the record carrier.

FIG. 6*a* further shows a portion, numbered 48.19(+24), located at the lower edge of one of the tracks in the group of 48 tracks. This location is a location that can be read in the +24 times nominal reproduction mode by one of the two read heads, in the present case, the read head having the first azimuth. As the location shown includes the subcode signal recording portion, it is possible to read the information in the subcode signal recording portion, also in the +24 times nominal reproduction mode.

Figure 7:
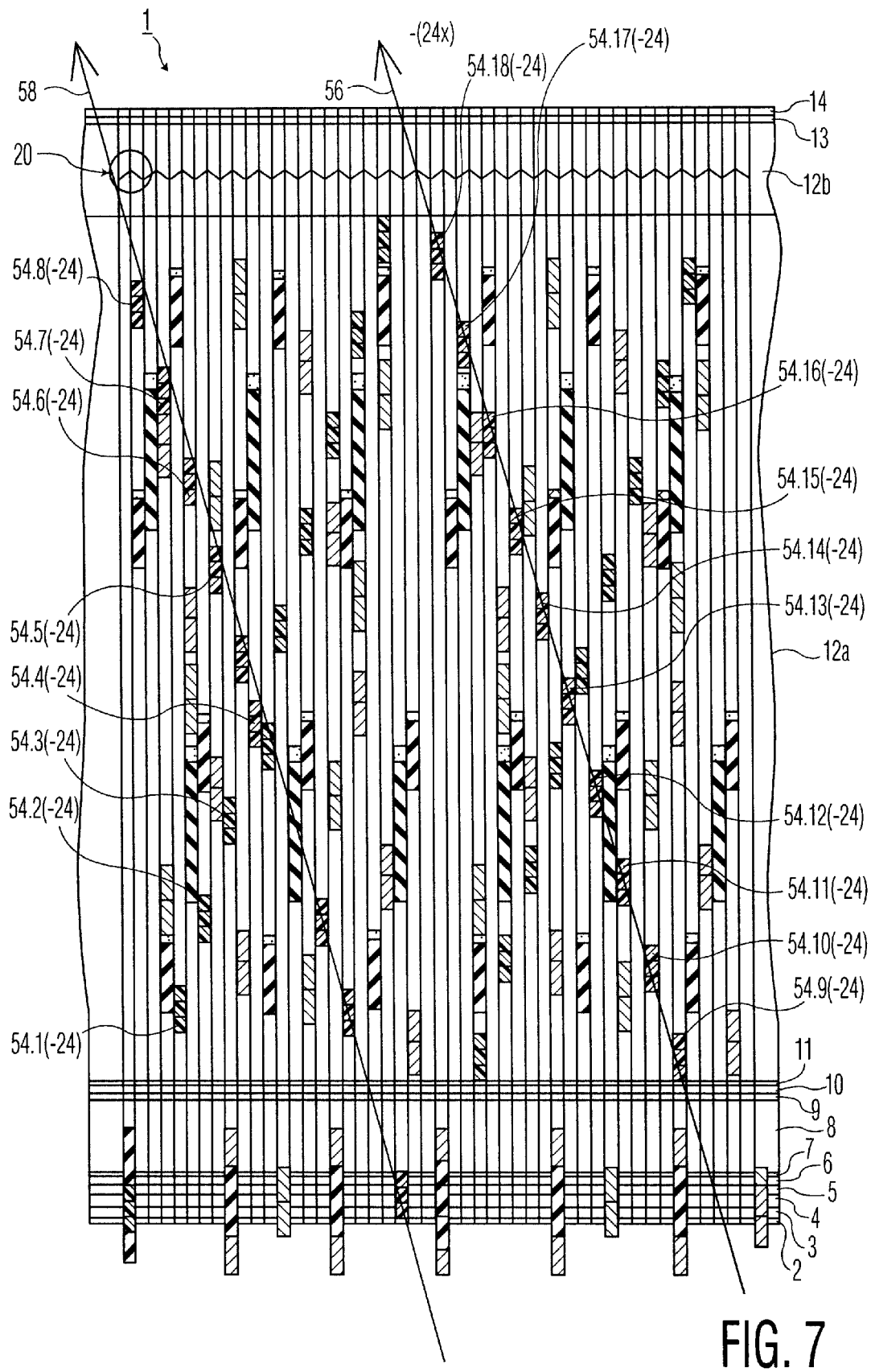
FIG. 7 shows the same format as FIG. 1, with the paths across the record carrier that the two reproduction heads follow during a sixth trick play reproduction mode, where the record carrier speed is −24 times nominal.

FIG. 7 shows a seventh information signal being recorded in specific segments in the tracks. Those segments are indicated in FIG. 7 by reference numerals 54.i(−24), where i runs from 1 to 18. This seventh information signal is meant for a reproduction in a reproduction apparatus at a reproduction speed which is −24 times the nominal reproduction speed (that is: in the backwards direction). This seventh information signal could be an information signal which has no relationship whatsoever with the first and/or second and/or third and/or fourth and/or fifth and/or sixth information signal introduced above. Alternatively, the seventh information signal could have a relationship with the first information signal, in the sense that the seventh information signal is a trick play signal for the −24 times nominal reproduction speed, in order to obtain a reproduced (video) signal, which is a replica of the reproduced first (video) signal, but reproduced at −24 times the nominal speed (that is: in the backwards direction).

Figure 7A:
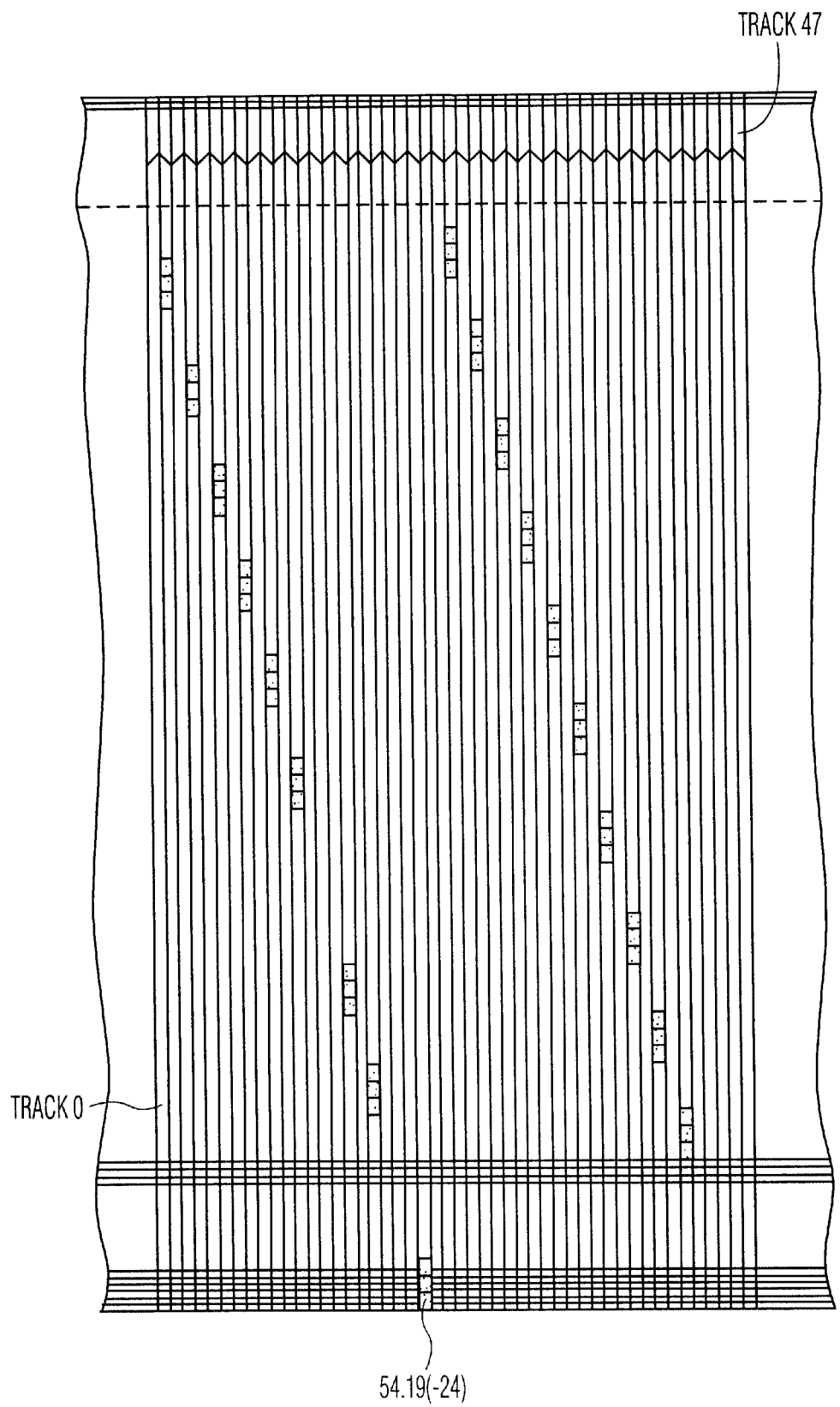
FIG. 7a shows the trick play segments for the −24 times nominal reproduction mode only, in the group of 48 tracks.

FIG. 7*a* shows the same group of 48 tracks as FIG. 7, however, only the 18 segments 54.i(−24) are shown in FIG. 7*a*. Assuming the track number of the first track in the group of 48 tracks to be track no. 0 and the track number of the last track in the group to be track number 47, the segments are recorded in the tracks with track number 1+n.2, 24+n.2 and 34+n.2, where n is an integer running from 0 to 4 inclusive and the tracks 11, 15 and 17.

FIG. 7 further shows two scanning lines 58 and 56. The double-arrowed scanning line 56 shows the path that the one read head, having the first azimuth angle, follows across the record carrier in the −24 times nominal reproduction mode, during one revolution of the head drum. The single-arrowed scanning line 58 shows the path that the other read head, having the second azimuth angle, follows across the record carrier in the −24 times nominal reproduction mode during the said one revolution of the head drum. As can be seen in FIG. 7, the one read head reads the trick play segments 54.i(−24), where i equals 1 to 8 inclusive, and the other read head thus reads the trick play segments 54.j(−24), where j equals 9 to 18 inclusive.

The trick play segments 54.i(−24) each have a length of 15 main sync blocks, where each segment comprises 5 sync blocks having information contents as regards the trick play information stored in those sync blocks and further, those 5 sync blocks are each repeated twice.

The trick play segments for the −24 times nominal reproduction speed can be realized as explained in the following example. When, again, numbering the main sync blocks, starting from 0, which is the first sync block in the aux recording area 8 in a track, until 305, which is the last sync block in the area 12*a* in the track, the sync blocks in the segment 54.9(−24) are the sync blocks in a track numbered 29 to 43 inclusive, where the sync blocks numbered 34 to 38 inclusive and 39 to 43 inclusive are repetitions of the sync blocks 29 to 33 inclusive. The sync blocks in the segment 54.1(−24) are the sync blocks in a track numbered 43 to 57 inclusive, where the sync blocks numbered 48 to 52 inclusive and 53 to 57 inclusive are repetitions of the sync blocks numbered 43 to 47 inclusive. The sync blocks in the segment 54.10(−24) are the sync blocks in a track numbered 57 to 71 inclusive, where the sync blocks numbered 62 to 66 inclusive and 67 to 71 inclusive are repetitions of the sync blocks 57 to 61. The sync blocks in the segment 54.2(−24) are the sync blocks in a track numbered 71 to 85 inclusive, where the sync blocks numbered 76 to 80 inclusive and 81 to 85 inclusive are repetitions of the sync blocks numbered 71 to 75 inclusive. The sync blocks in the segment 54.11(−24) are the sync blocks in a track numbered 86 to 100 inclusive, where the sync blocks numbered 91 to 95 inclusive and 96 to 100 inclusive are repetitions of the sync blocks 86 to 90 inclusive. The sync blocks in the segment 54.3(−24) are the sync blocks in a track numbered 128 to 142 inclusive, where the sync blocks numbered 133 to 137 inclusive and the sync blocks 138 to 142 inclusive are repetitions of the sync blocks numbered 128 to 132 inclusive. Further, the sync blocks in the segment 54.12(−24) are the sync blocks in a track numbered 114 to 128 inclusive, where the sync blocks numbered 119 to 123 inclusive and 124 to 128 inclusive are repetitions of the sync blocks 114 to 118 inclusive. The sync blocks in the segment 54.4(−24) are the sync blocks in a track numbered 157 to 171 inclusive, where the sync blocks numbered 162 to 166 inclusive and the sync blocks 167 to 171 are repetitions of the sync blocks numbered 157 to 161 inclusive.

The sync blocks in the segment 54.13(−24) are the sync blocks in a track numbered 143 to 157 inclusive, where the sync blocks numbered 148 to 152 inclusive and the sync blocks numbered 153 to 157 inclusive are repetitions of the sync blocks numbered 143 to 147 inclusive. The sync blocks in the segment 54.5(−24) are the sync blocks in a track numbered 185 to 199 inclusive, where the sync blocks numbered 190 to 194 inclusive and 195 to 199 inclusive are repetitions of the sync blocks numbered 185 to 189 inclusive.

The sync blocks in the segment 54.14(−24) are the sync blocks in a track numbered 171 to 185 inclusive, where the sync blocks numbered 176 to 180 inclusive and the sync blocks numbered 181 to 185 inclusive are repetitions of the sync blocks numbered 171 to 175 inclusive. The sync blocks in the segment 54.6(−24) are the sync blocks in a track numbered 214 to 228 inclusive, where the sync blocks numbered 219 to 223 inclusive and 224 to 228 inclusive are repetitions of the sync blocks numbered 214 to 218 inclusive.

The sync blocks in the segment 54.15(−24) are the sync blocks in a track numbered 200 to 214 inclusive, where the sync blocks numbered 205 to 209 inclusive and the sync blocks numbered 210 to 214 inclusive are repetitions of the sync blocks numbered 200 to 204 inclusive. The sync blocks in the segment 54.7(−24) are the sync blocks in a track numbered 242 to 256 inclusive, where the sync blocks numbered 247 to 251 inclusive and 252 to 256 inclusive are repetitions of the sync blocks numbered 242 to 246 inclusive.

The sync blocks in the segment 54.16(−24) are the sync blocks in a track numbered 228 to 242 inclusive, where the sync blocks numbered 233 to 237 inclusive and the sync blocks numbered 238 to 242 inclusive are repetitions of the sync blocks numbered 228 to 232 inclusive. The sync blocks in the segment 54.8(−24) are the sync blocks in a track numbered 271 to 285 inclusive, where the sync blocks numbered 276 to 280 inclusive and 281 to 285 inclusive are repetitions of the sync blocks numbered 271 to 275 inclusive.

The sync blocks in the segment 54.17(−24) are the sync blocks in a track numbered 257 to 271 inclusive, where the sync blocks numbered 262 to 266 inclusive and the sync blocks numbered 267 to 271 inclusive are repetitions of the sync blocks numbered 257 to 261 inclusive. The sync blocks in the segment 54.18(−24) are the sync blocks in a track numbered 285 to 299 inclusive, where the sync blocks numbered 290 to 294 inclusive and 295 to 299 inclusive are repetitions of the sync blocks numbered 285 to 289 inclusive.

Thus, during each revolution of the head drum, during a −24 times nominal reproduction mode, 270 sync blocks (18×15 sync blocks) of information of the seventh information signal are read from the record carrier, which is the same number of sync blocks as in the +24x reproduction mode.

FIG. 7a further shows a portion, numbered 54.19(−24), located at the lower edge of one of the tracks in the group of 48 tracks. This location is a location that can be read in the −24 times nominal reproduction mode by one of the two read heads, in the present case, the read head having the second azimuth. As the location shown includes the subcode signal recording portion, it is possible to read the information in the subcode signal recording portion, also in the −24 times nominal reproduction mode.

The trick play sync blocks for each of the various trick play modes described above have their own trick play sync block numbering. The trick play sync block numbering that will be discussed now, is thus different from the numbers used above to identify the exact locations of the various segments in a track.

As a general rule, it can be said that:

(a) for the trick play speeds +4x nominal and −4x nominal, in total, 100 trick play sync blocks are read during each revolution of the head drum, that is, 90 sync blocks comprising information of the trick play signals in question and 10 sync blocks comprising parity information. Those 90 trick play sync blocks are numbered 0 to 89 inclusive, in the order in which they are read during one revolution of the head drum in the trick play reproduction mode, where the trick play sync block 0 is the first trick play sync block read by the read head having the first azimuth. The 10 parity sync blocks are numbered 90 to 99, in the order in which they are read during one revolution of the head drum, where the trick play sync block 90 is the first trick play sync block comprising parity information that is read by the read head having the first azimuth.

(b) for the trick play speeds +12x and −12x nominal, in total, 180 trick play sync blocks are read during each revolution of the head drum, that is, 2 times 90 trick play sync blocks, as each trick play segment includes a number of 90 trick play sync blocks and one repetition of each of those 90 trick play sync blocks. Those 90 trick play sync blocks are again numbered 0 to 89 inclusive, in the order in which they are read during the said one revolution of the head drum in the trick play reproduction mode, where the sync block having the number 0 is the first trick play sync block that is read by the read head having the first azimuth.

(c) for the trick play speeds +24x and −24x nominal, in total, 270 trick play sync blocks are read during each revolution of the head drum, that is, 3 times 90 trick play sync blocks, as each trick play segment includes a number of 90 trick play sync blocks and two repetitions of each of those 90 trick play sync blocks. Those 90 trick play sync blocks are again numbered 0 to 89 inclusive, in the order in which they are read during the said one revolution of the head drum in the trick play reproduction mode, where the sync block having the number 0 is the first trick play sync block that is read by the read head having the first azimuth.

First, the trick play sync block numbering for the first trick play signal (+4x reproduction speed) will be discussed. In the time interval of one rotation of the head drum, during reproduction at the +4 times reproduction speed, the first read head having the first azimuth angle scans the trick play segment 22.5(+4) and the other read head scans the trick play segment 22.6(+4). The first 45 sync blocks in the segment 22.5(+4) have trick play sync block numbers running from 0 to 44 inclusive. The first 45 sync blocks in the segment 22.6(+4) have trick play sync block numbers running from 45 to 89 inclusive.

The five sync blocks in the segment 22.5(+4) comprising the parity information, following the 45 sync blocks numbered 0 to 44 inclusive, have trick play sync block numbers 90 to 94 inclusive and the five sync blocks in the segment 22.6(+4) comprising the parity information, following the 45 sync blocks numbered 45 to 89 inclusive, have trick play sync block numbers 95 to 99 inclusive.

The trick play sync block numbering described above is valid for all the pairs of segments 22.i(+4) and 22.i+1(+4), where i is odd. The trick play sync block numbering is thus repetitive for each rotation of the head drum in the +4 times reproduction mode.

It is thus interesting to note that the trick play sync block numbering in a segment is discontinuous across the boundary between the sync blocks comprising the parity information and the other sync blocks in the segment.

Next, the trick play sync block numbering for the second trick play signal (−4x reproduction speed) will be discussed. In the time interval of one rotation of the head drum, during reproduction at the −4 times reproduction speed, the first read head having the first azimuth angle scans the trick play segments 28.12(−4) and 28.11(−4) and the other read head scans the trick play segments 28.10(−4) and 28.9(−4). The first 23 sync blocks in the segment 28.12(−4) have trick play sync block numbers running from 0 to 22 inclusive. The first 22 sync blocks in the segment 28.11(−4) have trick play sync block numbers running from 23 to 44 inclusive.

The first 23 sync blocks in the segment 28.10(−4) have trick play sync block numbers running from 45 to 67 inclusive. The first 22 sync blocks in the segment 28.9(−4) have trick play sync block numbers running from 68 to 89 inclusive.

The two sync blocks in the segment 28.12(−4) comprising the parity information, following the 23 sync blocks numbered 0 to 22 inclusive, have trick play sync block numbers 90 and 91. The three sync blocks in the segment 28.11(−4) comprising the parity information, following the 22 sync blocks numbered 23 to 44 inclusive, have trick play sync block numbers 92 to 94 inclusive. The two sync blocks in the segment 28.10(−4) comprising the parity information, following the 23 sync blocks numbered 45 to 67 inclusive, have trick play sync block numbers 95 and 96. The three sync blocks in the segment 28.9(−4) comprising the parity information, following the 22 sync blocks numbered 68 to 89 inclusive, have trick play sync block numbers 97 to 99 inclusive.

The trick play sync block numbering described above is valid for all groups of four segments 28.i(−4), 28.i-1(−4), 28.i-2(−4) and 28.i-3(−4), where i equals 4, 8, 12, 16, 20 and 24. The trick play sync block numbering is thus repetitive for each rotation of the head drum in the −4 times reproduction mode.

It is further again interesting to note that the trick play sync block numbering in a segment is discontinuous across the boundary between the sync blocks comprising the parity information and the other sync blocks in the segment.

The reason for choosing the order of occurrence of the trick play sync blocks and trick play sync block numbering for the +4x and −4x trick play reproduction mode in the way as explained above is as follows. This choice has the advantage that carrying out an ECC encoding on the trick play data can become an optional recording feature, or, if the ECC encoding is indeed carried out on the trick play data upon recording, ECC correction may become an optional reproduction feature. The format enables a different ECC encoding, so that, e.g., more or lesser trick play sync blocks may be required for storing the parity data. As the parity sync blocks are located at the end of each of the segments, and the numbering of parity sync blocks (90 and higher) follows the numbering of the 89 trick play sync blocks (0 to 89 inclusive) comprising the 'real' information data, the numbering of those trick play sync blocks comprising 'real' data remains unchanged and can thus be processed in the reproducing apparatus independent of whether trick play sync blocks comprising parity data are present or not, or independent of the number of how many trick play sync blocks comprising parity data are present.

Next, the trick play sync block numbering for the third trick play signal (+12x reproduction speed) will be discussed. In the time interval of one rotation of the head drum, during reproduction at the +12 times reproduction speed, the first read head having the first azimuth angle scans the trick play segments 34.i(+12), where i runs from 5 to 8, and the other read head scans the trick play segments 34.j(+12), where j runs from 9 to 12. The first 12 sync blocks in the segment 34.5(+12) have trick play sync block numbers running from 0 to 11 inclusive. The first 11 sync blocks in the segment 34.6(+12) have trick play sync block numbers running from 12 to 22 inclusive. The first 11 sync blocks in the segment 34.7(+12) have trick play sync block numbers running from 23 to 33 inclusive. The first 11 sync blocks in the segment 34.8(+12) have trick play sync block numbers running from 34 to 44 inclusive.

The first 12 sync blocks in the segment 34.9(+12) have trick play sync block numbers running from 45 to 56 inclusive. The first 11 sync blocks in the segment 34.10(+12) have trick play sync block numbers running from 57 to 67 inclusive. The first 11 sync blocks in the segment 34.11(+12) have trick play sync block numbers running from 68 to 78 inclusive. The first 11 sync blocks in the segment 34.12(+12) have trick play sync block numbers running from 79 to 89 inclusive.

The second 11 or 12 sync blocks, being repetitions of the first 11 or 12 sync blocks, respectively, in a segment, have the same trick play sync block numbers as the sync blocks from which they are repetitions.

The trick play sync block numbering described above is valid for all groups of eight segments 34.i(+12), where i runs from 5 to 12 inclusive, and where i runs from 13, . . . 16, 1, . . . 4. The trick play sync block numbering from 0 to 89 is thus repetitive for each rotation of the head drum in the +12 times reproduction mode.

Next, the trick play sync block numbering for the fourth trick play signal (−12x reproduction speed) will be discussed. In the time interval of one rotation of the head drum, during reproduction at the −12 times reproduction speed, the first read head having the first azimuth angle scans the trick play segments 40.i(−12), where i runs from 5 to 9, and the other read head scans the trick play segments 40.j(−12), where j runs from 1 to 4. The first 10 sync blocks in the segment 40.5(−12) have trick play sync block numbers running from 0 to 9 inclusive. The first 10 sync blocks in the segment 40.6(−12) have trick play sync block numbers running from 10 to 19 inclusive. The first 10 sync blocks in the segment 40.7(−12) have trick play sync block numbers running from 20 to 29 inclusive. The first 10 sync blocks in the segment 40.8(−12) have trick play sync block numbers running from 30 to 39 inclusive. The first 10 sync blocks in the segment 40.9(−12) have trick play sync block numbers running from 40 to 49 inclusive. The first 10 sync blocks in the segment 40.1(−12) have trick play sync block numbers running from 50 to 59 inclusive. The first 10 sync blocks in the segment 40.2(−12) have trick play sync block numbers running from 60 to 69 inclusive. The first 10 sync blocks in the segment 40.3(−12) have trick play sync block numbers running from 70 to 79 inclusive. The first 10 sync blocks in the segment 40.4(−12) have trick play sync block numbers running from 80 to 89 inclusive.

The second 10 sync blocks in the trick play segments, being repetitions of the first 10 sync blocks in a segment, have the same trick play sync block numbers as the sync blocks from which they are repetitions.

The trick play sync block numbering described above is valid for all groups of nine segments 40.i(−12) to 40.i +8(−12) inclusive, where i equals 1 and 10. The trick play sync block numbering from 0 to 89 is thus repetitive for each rotation of the head drum in the −12 times reproduction mode.

Next, the trick play sync block numbering for the fifth trick play signal (+24x reproduction speed) will be discussed. In the time interval of one rotation of the head drum, during reproduction at the +24 times reproduction speed, the first read head having the first azimuth angle scans the trick play segments 48.i(+24), where i runs from 1 to 9, and the other read head scans the trick play segments 48.j(+24), where j runs from 10 to 18. The first five sync blocks in the segment 48.1(+24) have trick play sync block numbers running from 0 to 4 inclusive. The first 5 sync blocks in the segment 48.2(+24) have trick play sync block numbers running from 5 to 9 inclusive. The first 5 sync blocks in the segment 48.3(+24) have trick play sync block numbers running from 10 to 14 inclusive. The first 5 sync blocks in the segment 48.4(+24) have trick play sync block numbers running from 15 to 19 inclusive. The first 5 sync blocks in the segment 48.5(+24) have trick play sync block numbers running from 20 to 24 inclusive. The first 5 sync blocks in the segment 48.6(+24) have trick play sync block numbers running from 25 to 29 inclusive. The first 5 sync blocks in the segment 48.7(+24) have trick play sync block numbers running from 30 to 34 inclusive. The first 5 sync blocks in the segment 48.8(+24) have trick play sync block numbers running from 35 to 39 inclusive. The first 5 sync blocks in the segment 48.9(+24) have trick play sync block numbers running from 40 to 44 inclusive. The first five sync blocks in the segment 48.10(+24) have trick play sync block numbers running from 45 to 49 inclusive. The first 5 sync blocks in the segment 48.11(+24) have trick play sync block numbers running from 50 to 54 inclusive. The first 5 sync blocks in the segment 48.12(+24) have trick play sync block numbers running from 55 to 59 inclusive. The first 5 sync blocks in the segment 48.13(+24) have trick play sync block numbers running from 60 to 64 inclusive. The first 5 sync blocks in the segment 48.14(+24) have trick play sync block numbers running from 65 to 69 inclusive. The first 5 sync blocks in the segment 48.15(+24) have trick play sync block numbers running from 70 to 74 inclusive. The first 5 sync blocks in the segment 48.16(+24) have trick play sync block numbers running from 75 to 79 inclusive. The first 5 sync blocks in the segment 48.17(+24) have trick play sync block numbers running from 80 to 84 inclusive. The first 5 sync blocks in the segment 48.18(+24) have trick play sync block numbers running from 85 to 89 inclusive.

The second group of 5 sync blocks and the third group of 5 sync blocks in the segments are repetitions of the first group of 5 sync blocks in a segment. Those sync blocks have the same trick play sync block numbers as the sync blocks in the first group from which they are repetitions.

The trick play sync block numbering described above is valid for all groups of 18 segments 48.i(+24) in a group of 48 tracks, where i runs from 1 to 18. The trick play sync block numbering from 0 to 89 is thus repetitive for each rotation of the head drum in the +24 times reproduction mode.

Next, the trick play sync block numbering for the sixth trick play signal (−24x reproduction speed) will be discussed. In the time interval of one rotation of the head drum, during reproduction at the −24 times reproduction speed, the first read head having the first azimuth angle scans the trick play segments 54.i(−24), where i runs from 9 to 18, and the other read head scans the trick play segments 54.j(−24), where j runs from 1 to 8. The first five sync blocks in the segment 54.9(−24) have trick play sync block numbers running from 0 to 4 inclusive. The first 5 sync blocks in the segment 54.10(−24) have trick play sync block numbers running from 5 to 9 inclusive. The first 5 sync blocks in the segment 54.11(−24) have trick play sync block numbers running from 10 to 14 inclusive. The first 5 sync blocks in the segment 54.12(−24) have trick play sync block numbers running from 15 to 19 inclusive. The first 5 sync blocks in the segment 54.13(−24) have trick play sync block numbers running from 20 to 24 inclusive. The first 5 sync blocks in the segment 54.14(−24) have trick play sync block numbers running from 25 to 29 inclusive. The first 5 sync blocks in the segment 54.15(−24) have trick play sync block numbers running from 30 to 34 inclusive. The first 5 sync blocks in the segment 54.16(−24) have trick play sync block numbers running from 35 to 39 inclusive. The first 5 sync blocks in the segment 54.17(−24) have trick play sync block numbers running from 40 to 44 inclusive. The first five sync blocks in the segment 54.18(−24) have trick play sync block numbers running from 45 to 49 inclusive. The first 5 sync blocks in the segment 54.1(−24) have trick play sync block numbers running from 50 to 54 inclusive. The first 5 sync blocks in the segment 54.2(−24) have trick play sync block numbers running from 55 to 59 inclusive. The first 5 sync blocks in the segment 54.3(−24) have trick play sync block numbers running from 60 to 64 inclusive. The first 5 sync blocks in the segment 54.4(−24) have trick play sync block numbers running from 65 to 69 inclusive. The first 5 sync blocks in the segment 54.5(−24) have trick play sync block numbers running from 70 to 74 inclusive. The first 5 sync blocks in the segment 54.6(−24) have trick play sync block numbers running from 75 to 79 inclusive. The first 5 sync blocks in the segment 54.7(−24) have trick play sync block numbers running from 80 to 84 inclusive. The first 5 sync blocks in the segment 54.8(−24) have trick play sync block numbers running from 85 to 89 inclusive.

The second and third group of 5 sync blocks in the segments are repetitions of the first group of 5 sync blocks in a segment. The sync blocks in those second and third groups have the same trick play sync block numbers as the sync blocks in the first group from which they are repetitions.

The trick play sync block numbering described above is valid for all groups of 18 segments 54.i(−24) in a group of 48 tracks, where i runs from 1 to 18. The trick play sync block numbering from 0 to 89 is thus repetitive for each rotation of the head drum in the −24 times reproduction mode.

The trick play sync block numbers 0 to 99 require a 7-bit count word, denoted TPSB#. During a scan of the record carrier by one of the read heads in a trick play reproduction mode, at maximum 55 trick play sync blocks are read. So, when taken into account the read head that is in reproducing contact with the record carrier, one could use a 6-bit count word RSB# as the sync block number of the trick play sync blocks, and thereby saving one bit during storage of the trick play sync blocks on the record carrier.

The 7-bit trick play sync block numbers TPSB# can be converted in the following way into the 6-bit numbers RSB#:

1.1 RSB# equals the 6 least significant bits of TPSB#, when the trick play sync block number is smaller than 50 and the corresponding trick play sync block is written by the first write head, having the first azimuth angle.

1.2 Otherwise, RSB# equals the 6 least significant bits of (TPSB#−40).

Reconversion into the trick play sync block number upon reproduction in a trick play mode is realized in the following way:

2.1 The 6 least significant bits of TPSB# equal RSB#, when the RSB# is smaller than 50 and the corresponding trick play sync block is read by the first read head, having the first azimuth angle. The 7th bit of TPSB# is then taken '0'.

2.2 Otherwise, TPSB#=RSB#+40.

Next, a table follows showing the trick play sync block numbers TPSB# for the +4x trick play reproduction mode, where the read head having the first azimuth reads the trick play sync blocks numbered 0 to 49 inclusive, and 90 to 94 inclusive, during one scan, and the read head having the second azimuth reads the trick play sync blocks numbered 45 to 89 inclusive and 95 to 99 inclusive.

| TPSB# | TP data SB's | TP parity SB's |
|---|---|---|
| 1st azimuth | 0 . . . 49 | 90 . . . 94 |
| 2nd azimuth | 45 . . . 89 | 95 . . . 99 |

Upon conversion, as explained above, the RSB# are as follows:

| RSB# | TP data SB's | TP parity SB's |
|---|---|---|
| 1st azimuth | 0 . . . 49 | 50 . . . 54 |

-continued

| RSB# | TP data SB's | TP parity SB's |
|---|---|---|
| 2nd azimuth | 5 ... 49 | 55 ... 59 |

As can be seen from the second table, the value '40' given in the formula under point 1.2 above, cannot be a higher value, as in such cases, the RSB# for the trick play parity sync blocks would become smaller than 50, and thus trick play sync blocks read by the head having the first azimuth would have equal sync block numbers, which is unacceptable. Further, the value to be subtracted from TPSB# cannot be smaller than 36, as, in this case the RSB# for the trick play parity sync blocks read by the second azimuth head would run from 59 to 63. 63 is the highest number than can be represented by the 6-bit RSB word.

Next, the format of the trick play sync blocks will be discussed with reference to FIG. 8. A trick play sync block has the same length as the other sync blocks in the main data area 12 of FIG. 1, in which the first digital information signal is stored. A trick play sync block is 112 bytes long and comprises a sync word of 2 bytes long, an identification portion 60, denoted ID, a header portion 61, denoted 'main header', an aux byte 62, denoted 'data-aux' and a data area 64, which is 104 bytes long. The data area 64 has room for storage of 96 bytes of data of a trick play signal (one of the second to seventh information signals) and 8 parity bytes.

Figure 8:
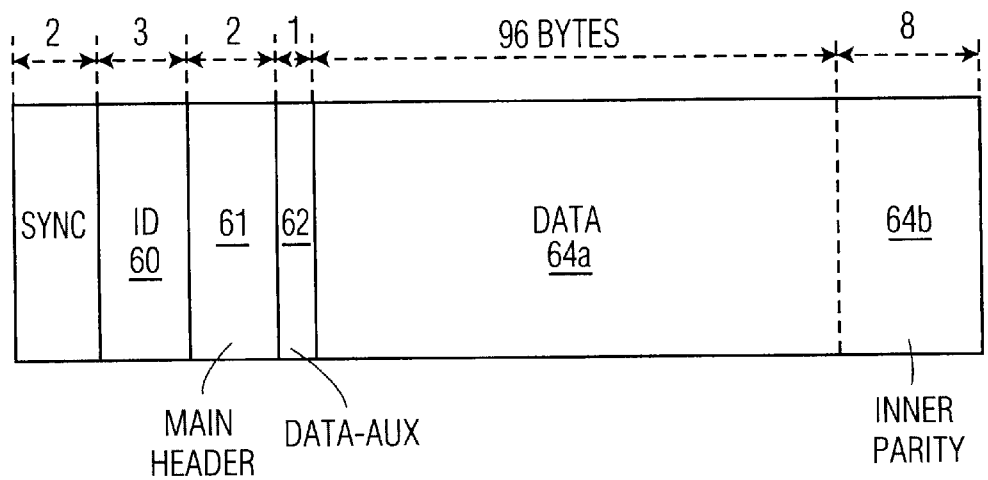
FIG. 8 shows the format of a sync block.
Figure 9:
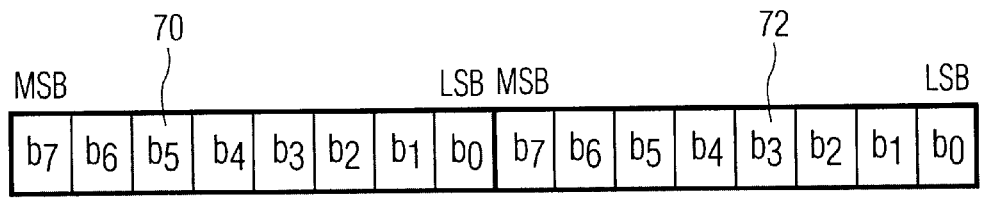
FIG. 9 shows the format of the data header portion in the sync block of FIG. 8.

FIG. 9 shows the two bytes 70 and 71 of the main header area 61 of FIG. 8. Only six bits, that is: the bits $b_0$ to $b_5$ of the byte 72 of the main header area 61, are available for storing a trick play sync block number TPSB#, although the TPSB# is expressed as a 7-bit number. The 6-bit number that can be stored in the six bits $b_0$ to $b_5$ of the byte 72 is denoted as RSB#.

Further, a trick play speed identifier is stored in the trick play sync blocks. The trick play speed identifier identifies the trick play speeds ±4x, ±12x and ±24x. A 2-bit word suffices for such identification. This 2-bit trick play speed identifier word is stored in the two remaining bits $b_6$ and $b_7$ of the byte 72 in FIG. 9. In addition, a direction identifier needs to be stored in the trick play sync blocks in order to identify a trick play block for a trick play speed identified by the 2-bit trick play speed identifier as being a trick play sync block for the said speed in the forward or the backwards direction. The byte 70, see FIG. 9, in the main header area 61, see FIG. 8, can be used for storing the direction identifier. More specifically, the 2-bit word $b_3$, $b_2$ comprises the direction identifier, such that the 2-bit word '10' means that the trick play sync block is meant for a trick play speed in the forward direction, while the 2-bit word '11' means that the trick play sync block is meant for a trick play speed in the reverse direction. In addition, it should be noted that the bits $b_3$, $b_2$='00' in byte 70 means that the sync block is a sync block comprising 'normal play' data.

Normal play sync blocks as well as trick play sync blocks may comprise dummy data. That means that the data area 64 of such sync blocks comprises useless information for the trick play speed for which the trick play sync block is meant. The 2-bit word $b_3$, $b_2$ of the byte 70, when being equal to '01', means that the sync block in question comprise dummy data. For such dummy data sync block, it is thus not possible to store the direction identifier at that same position in the byte 70. In that situation, the two bits $b_0$ and $b_1$ of the byte 70 are used. More specifically, when the bits $b_3$, $b_2$ equal '01' (dummy data), the bits $b_0$, $b_1$ have the following meaning:

$b_1$, $b_0$='00', means dummy data for 'normal play'.
$b_1$, $b_0$='01', means dummy data for trick play forward.
$b_1$, $b_0$='10', means dummy data for trick play reverse.

It will be evident that other 2-bit words could have been used as an alternative. For instance, $b_1$, $b_0$='10' could have meant dummy data for trick play forward and '01' could have meant dummy data trick play reverse.

A further feature that should be discussed is the time stamping of trick play sync blocks. Time stamping is well known in the art. Reference is made in this respect to U.S. Pat. No. 5,579,183, document D1 in the List Of Related Documents, and International Application WO 96/30.905, document D2 in the List Of Related Documents. The documents describe the recording of MPEG packets on a record carrier, where time stamps are added to an MPEG packet upon arrival and the packet is subsequently recorded. Upon reproduction, the packet is read from the record carrier, the time stamp is retrieved from the packet and used for supplying the packet at the right moment to an output.

Figure 10:
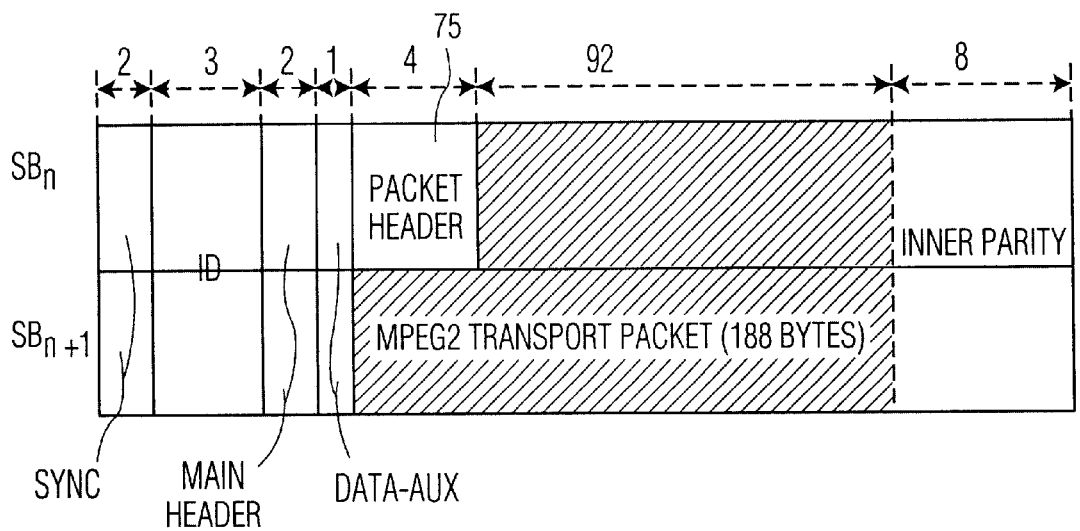
FIG. 10 shows two subsequent sync blocks in which an MPEG packet is stored.
Figure 11:
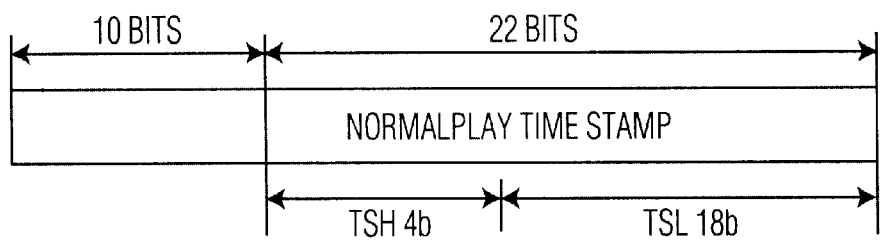
FIG. 11 shows the contents of the packet header in the first of the two subsequent sync blocks of FIG. 10, this packet header including the time stamps.

FIG. 10 shows how an MPEG transport packet, which is 188 bytes long, is stored in two subsequent sync blocks, more specifically in the data area 64a of two subsequent sync blocks. First, a packet header 75, which is 4 bytes long, is stored in the data area 64a of the first of the two sync blocks, denoted $SB_n$. Next, 92 bytes of the MPEG packet are stored in the remaining portion of the data area 64a of sync block $SB_n$. The remaining 96 bytes of the MPEG packet are stored in the data area 64a of the second sync block $SB_{n+1}$. The time stamp corresponding to a transport packet is stored in the packet header 75. This is shown in FIG. 11. More precisely, the time stamp for 'normal play' data is 22 bits long and is stored in the last 22 bits of the packet header 75.

The 22-bit time stamp for the 'normal play' data has been divided into a TSL (time stamp low) portion and a TSH (time stamp high) portion. The TSL portion is 18 bits long and runs cyclically with a modulo value of 225,000, for an apparatus in which the head drum rotates with 1800 rpm, or with a modulo value of 225,225, for an apparatus in which the head drum rotates with 1800/1.001 rpm. The TSH portion is 4 bits long and runs cyclically with a modulo value of 12. Upon each return to 0 for TSL, the TSH value is increased by one.

A time stamp counter is available in the recording apparatus to be described later. For the generation of time stamps for the MPEG packets for a 'normal play' information signal, the time stamp counter has a period equal to six revolutions of the head drum. The time stamp counter generates, in the present example, the 22-bit time stamps in the form of count words with a clock frequency of 27 MHz.

Trick play information for a specific trick play speed can be obtained from an MPEG data stream by retrieving packets comprising I-frames, well known in the art, from the MPEG data stream, and storing those packets in the trick play sync blocks.

A time stamp counter, which can be the same counter as mentioned above, is available for the generation of time stamps for the MPEG packets for a trick play information signal. This time stamp counter has a period equal to one revolution of the head drum. The time stamp counter generates, in the present example, 20-bit count words with a clock frequency of 27 MHz. The time stamp for the trick play data is again made up of an 18-bit TSL (time stamp low) portion, identical to the TSL portion described above for the normal play time stamps, and a TSH' (time stamp high) portion. TSL runs cyclically with a modulo value of 225, 000, for an apparatus in which the head drum rotates with 1800 rpm, or with a modulo value of 225,225, for an apparatus in which the head drum rotates with 1800/1.001 rpm. The TSH' portion is 2 bits long and runs cyclically with a modulo value of 4. Upon each return to 0 for TSL, the TSH' value is increased by one. As a result, the period of TSL equals one quarter of a rotation of the head drum and the trick play time stamp counter is periodic with the one revolution of the head drum. The time stamp counter is synchronized with the head switch pulse, normally present in the apparatus.

Figure 12:
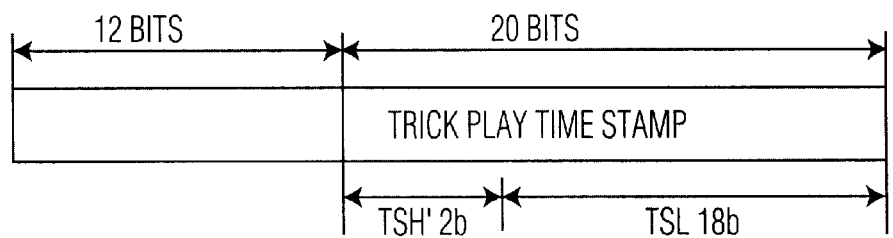
FIG. 12 shows the contents of the packet header in the first of the two subsequent trick play sync blocks of FIG. 10, this packet header including the time stamps for packets in a trick play data stream of packets.

The 20-bit time stamp is stored in the packet header 75 of the first of two subsequent trick play sync blocks in which the MPEG packet corresponding to this time stamp is stored, see FIG. 12.

A transport packet for storing in two subsequent trick play sync blocks thus has a time stamp and the two subsequent trick play sync blocks in which the transport packet is stored have corresponding trick play sync block numbers that relate to the position in the tracks where those trick play sync blocks are recorded.

From the time stamp added to the transport packet, a nominal trick play sync block number for the two trick play sync blocks in which the transport packet is stored can be derived, using the following equation:

$$NTPSB\#=int[(k+n/N)\cdot 90/4],$$

where NTPSB# is the nominal trick play sync block number, N is a constant which equals 225,000 in a recording apparatus in which the rotating head drum rotates with 1800 rpm, and equals 225,225 in a recording apparatus in which the rotating head drum rotates with 1800/1.001 rpm, n equals the decimal value of TSL and k is the decimal value of TSH'.

Next, the two subsequent trick play sync blocks are recorded in specific positions in one or two tracks on the record carrier. Those positions correspond to the actual trick play sync block numbers, denoted ATPSB#, stored in those trick play sync blocks.

The relation between the actual trick play sync block number ATPSB# of a trick play sync block and the nominal trick play sync block number NTPSB# derived for that block is now as follows:

$$NTPSB\#-45<ATPSB\#<NTPSB\#+45.$$

In this way, it is guaranteed that the position, where a trick play sync block including part of a trick play packet is recorded in the tracks on the record carrier during one revolution of the head drum, is not too far away from the position where it optimally should have been recorded, so that the buffer memory for storing the packets read from the record carrier upon reproduction need not be too large. The above formula makes clear that a trick play sync block comprising part of a trick play packet is recorded in the same track as the nominal position or in a track earlier or later. But, even when recorded in an earlier or a later track, it is assured that the trick play block is shifted back to its correct position, viewed in time, upon reproduction.

The formula given above is valid for all the trick play information signals recorded on the record carrier, where it should be noted that, when ATPSB# is chosen smaller than 0, this means that the trick play sync block having the trick play sync block number ATPSB#+90 is recorded during the previous revolution of the head drum, while, when ATPSB# is chosen larger than 89, this means that the trick play sync block having the trick play sync block number ATPSB-90 is recorded during the subsequent revolution of the head drum.

Figure 13:
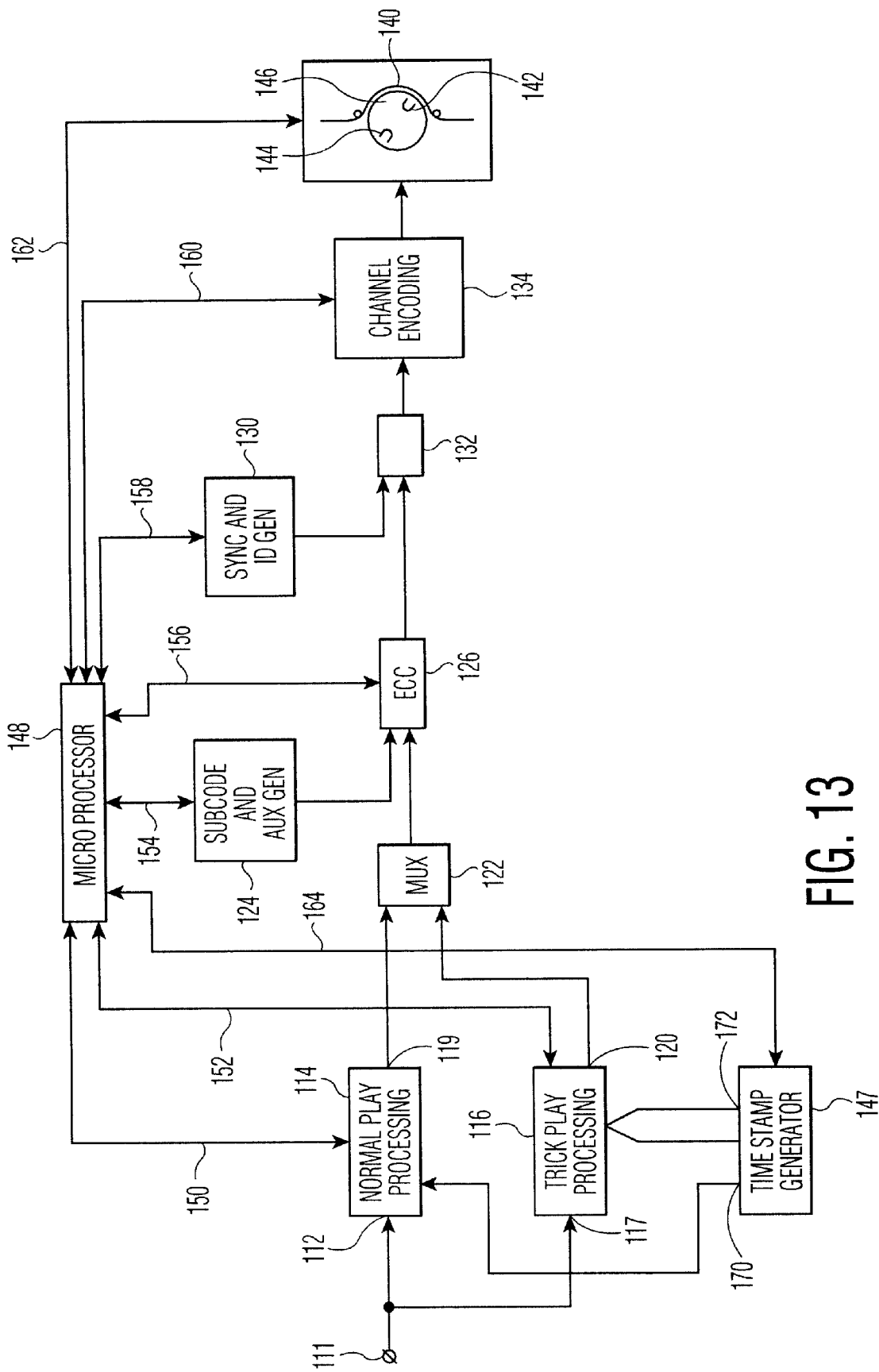
FIG. 13 shows an embodiment of a recording apparatus in accordance with the invention.

Next, an apparatus of the helical scan type, for recording the trick play information on a longitudinal record carrier, is described. FIG. 13 shows the recording apparatus which comprises an input terminal 111 for receiving a video signal and a corresponding audio signal. The video signal and the corresponding audio signal may have been encoded into transport packets included in an MPEG serial datastream, well known in the art. The input terminal 111 is coupled to an input 112 of a 'normal play' processing unit 114. Further, a 'trick play' processing unit 116 is provided having an input 117 also coupled to the input terminal 111. Outputs 119 and 120 of the 'normal play' processing unit 114 and the 'trick play' processing unit 116 are coupled to corresponding inputs of a multiplexer 122. The 'normal play' information as well as the 'trick play' information will be recorded in the main area recording portion 12 of the track shown in FIG. 2.

For a further description of the 'normal play' processing unit 114 and the 'trick play' processing unit 116, reference is made to U.S. Pat. No. 5,579,183, document D1 in the List Of Related Documents.

A subcode and auxiliary signal generator 124 is present for supplying the subcode signal information for storage in the subcode signal recording portion 4, and for supplying the auxiliary signal for storage in the auxiliary signal recording portion 8, see FIG. 2. Outputs of the multiplexer 122 and the generator 124 are coupled to corresponding inputs of an error correction encoder unit 126. The error correction encoder unit 126 is capable of carrying out a error correction encoding step on the 'normal play' (video and audio) information and the trick play information, so as to obtain the parity information shown in the portion 12b of the main signal recording portion 12 in FIG. 2, and in the portions 64b of the sync blocks, see FIGS. 8 and 10.

The recording apparatus further comprises a generator 130 for adding the sync and ID information for the sync blocks, such as shown in FIG. 8. After combination of the signals in the combining unit 132, the combined signal is applied to a unit 134, in which a channel encoding is carried out on the composite signal. The channel encoding carried out in the encoding unit 134 is well known in the art. For an example of such channel coding, reference is made in this respect to U.S. Pat. No. 5,142,421, document D3 in the List Of Related Documents.

An output of the channel encoding unit 134 is coupled to an input of a writing unit 136, in which the datastream obtained with the encoding unit 134 is recorded in the slant tracks on a record carrier 140, by means of at least two write heads 142 and 144 positioned on a rotating head drum 146. The write heads 142 and 144 have head gaps with a mutually different azimuth angle, so that (e.g.) the write head 142 write the tracks having an azimuth from bottom left to top right in FIG. 1, and the write head 144 writes the tracks having an azimuth angle from top left to bottom right in FIG. 1. Further, a time stamp generator 147 is available for generating time stamps for the normal play processing unit 114 and the trick play processing unit 116.

A microprocessor unit 148 is present for controlling the functioning of the various blocks, such as:

the control of the normal play signal processing block 114 via the control connection 150, the control of the trick play signal processing block 116 via the control connection 152, the control of the subcode signal and auxiliary signal generator block 124 via the control connection 154, the control of the error correction encoding block 126 via the control connection 156, the control of the sync signal and ID signal generator block 130 via the control connection 158, the control of the channel encoding block 134 via the control connection 160, the control of the transport velocity of the record carrier 140 and the rotation of the head drum 146, via the control connection 162, and the control of the time stamp generator 147 via the control connection 164.

The trick play processing 116 is adapted to retrieve I-frame information from the first information signal, in a way well known in the art. An additional error correction encoding step is carried out in the processing unit 116 on the trick play information in order to generate the 10 trick play sync blocks comprising the parity information for the +4x and −4x trick play speed. Further, repetitions of trick play sync blocks are generated for the +12x, −12x, +24x and −24x trick play information signals.

Further, for each trick play information signal, trick play sync blocks are generated, in the sense that for each trick play sync block the trick play speed identifier and the direction identifier are generated and stored in the trick play sync block at the location described above. Also, a trick play sync block number ATPSB# is generated in the way described above and stored in the trick play sync block, and a time stamp is added to each packet in the various trick play information signals.

Next, the trick play sync blocks and the 'normal play' sync blocks, generated by the normal play signal processing unit 114, are combined in the multiplexer unit 122, such that, for recording information in one complete track by one of the write heads, the sequence of sync blocks of the normal play information and the trick play information is such that the main data area 12 of one of the 48 tracks shown in FIG. 1 can be created.

Subcode data and auxiliary data is added and an error correction encoding is carried out on the combined normal play data and trick play data so as to obtain the parity information for the track portion 12b. Further, sync words and identification information are added. Next, a channel encoding step is carried out on the information prior to recording the information in the tracks.

It should be noted that, upon recording groups of 48 subsequent tracks, two tracks in each group, that are the first and the last one shown in FIG. 1, are devoid of any trick play segments. This enables the possibility to realize editing, where the edit points can be chosen exactly at the location of the two tracks that have no trick play segments recorded in them.

An embodiment of the time stamp generator unit 147 will be described hereafter. It is known in the art, see International Application WO 96/30.905-A2, document D2 in the List Of Related Documents, to provide the time stamp generator unit 147 with an oscillator that is locked to the program clock reference (PCR) included in the MPEG packets, which oscillator supplies count pulses with a 27 MHz frequency to a counter.

Figure 14:
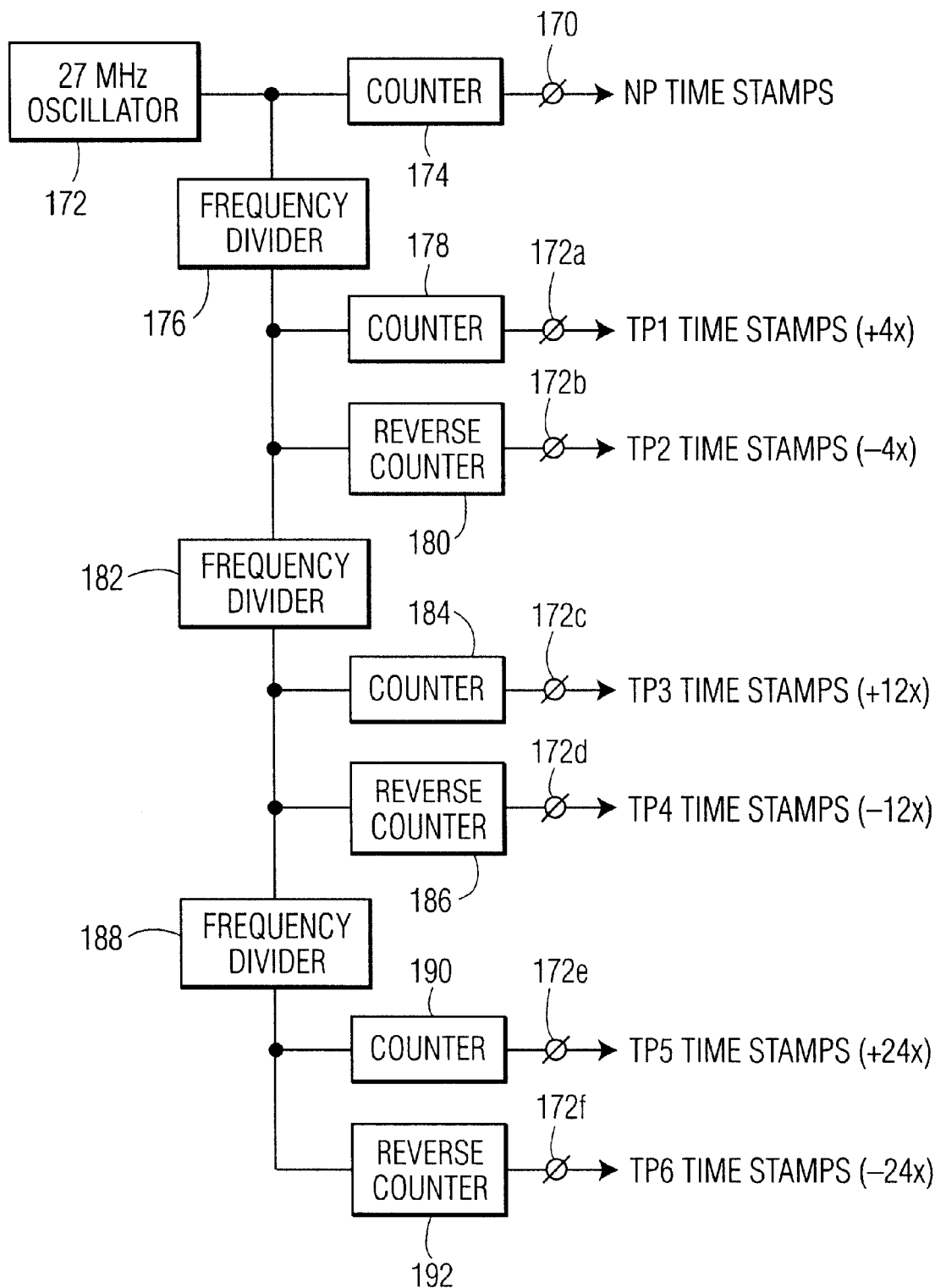
FIG. 14 shows an embodiment of a time stamp generator in the apparatus of FIG. 13.

FIG. 14 shows an embodiment of the time stamp generator 147 provided with a 27 MHz oscillator 172, which supplies 27 MHz clock pulses to a counter 174. In response to this, the counter 174 generates 'normal play' (NP) time stamps at a rate of 27 MHz to an output 170, for supply to the normal play processing unit 114. The 27 MHz clock pulses are also supplied to a frequency divider 176, which divides the clock frequency by 4. The value 4 relates to the ratio of the first trick play speed (4x) to the nominal speed (1x). The clock pulses, divided by 4 in frequency, are supplied to a counter 178, to a reverse counter 180 and to another frequency divider 182. The counter 178 supplies the trick play (TP1) time stamps for the first trick play information signal, which is the trick play signal for a reproduction speed of +4 times the nominal speed and supplies the TP1 time stamps via the output 172a to the trick play processing unit 116. The reverse counter 180 supplies the trick play (TP2) time stamps for the second trick play information signal, which is the trick play signal for a reproduction speed of −4 times the nominal speed and supplies the TP2 time stamps via the output 172b to the trick play processing unit 116.

The reason for the frequency division by a factor of 4 in the frequency divider 176 is the following. Suppose that the NP time stamps from the counter 174 would have been used for time stamping the packets for the first trick play signal. Upon reproduction at a speed 4 times the nominal speed, those packets would come with a speed 4 times higher. By dividing the frequency of generation of the time stamps by four, as in the frequency divider 176 and using those time stamps for time stamping the packets of the first trick play signal, the correct timing for the packets of the trick play signal upon reproduction in the trick play mode can be regained. Further, in order to obtain the correct timing upon reproduction of the −4 times trick play signal, it is required to reverse the order of generation of the time stamps as a function of time. This is realized by reversing the count values in the reverse counter 180.

The frequency of the clock pulses supplied by the frequency divider 176 to the frequency divider 182 are now divided by 3 in the frequency divider 182. The value 3 relates to the ratio of the second trick play speed (12x) to the first trick play speed (4x). The clock pulses, divided by 3 in frequency, are supplied to a counter 184, to a reverse counter 186 and to another frequency divider 188. The counter 184 supplies the trick play (TP3) time stamps for the third trick play information signal, which is the trick play signal for a reproduction speed of +12 times the nominal speed and supplies the TP3 time stamps via the output 172c to the trick play processing unit 116. The reverse counter 186 supplies the trick play (TP4) time stamps for the fourth trick play information signal, which is the trick play signal for a reproduction speed of −12 times the nominal speed and supplies the TP4 time stamps via the output 172d to the trick play processing unit 116.

The frequency of the clock pulses supplied by the frequency divider 182 to the frequency divider 188 are now divided by 2 in the frequency divider 188. The value 2 relates to the ratio of the third trick play speed (24x) to the second trick play speed (12x). The clock pulses, divided by 2 in frequency, are supplied to a counter 190 and to a reverse counter 192. The counter 190 supplies the trick play (TP5) time stamps for the fifth trick play information signal, which is the trick play signal for a reproduction speed of +24 times the nominal speed and supplies the TP5 time stamps via the output 172e to the trick play processing unit 116. The reverse counter 192 supplies the trick play (TP6) time stamps for the sixth trick play information signal, which is the trick play signal for a reproduction speed of −24 times the nominal speed and supplies the TP6 time stamps via the output 172f to the trick play processing unit 116.

Figure 15:
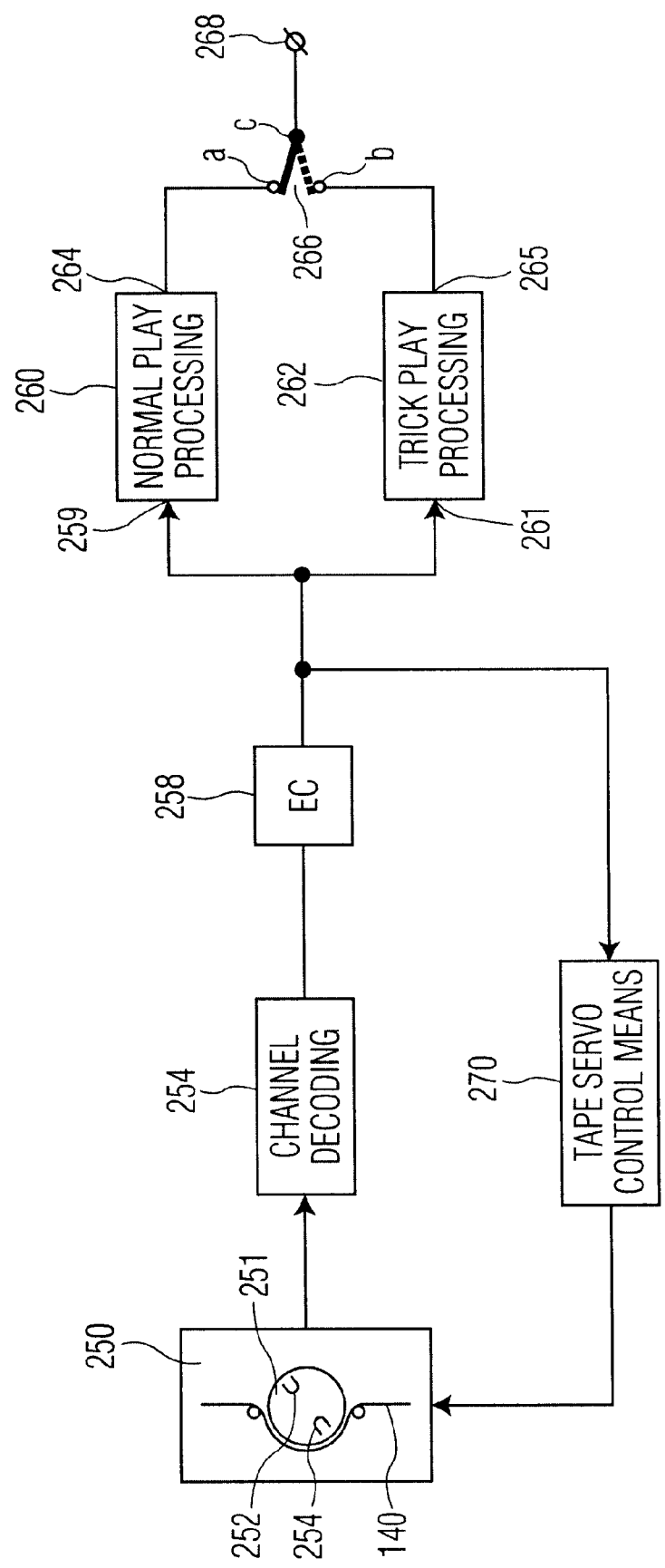
FIG. 15 shows an embodiment of a reproduction apparatus.

FIG. 15 shows, schematically, an embodiment of a reproduction apparatus for reproducing information from the record carrier 140 obtained with the recording apparatus of FIG. 13. The reproduction apparatus comprises a reading unit 250, having at least two read heads 252 and 254, for reading information from the slant tracks on the record carrier 140. The one read head has a gap with an azimuth angle which equals the azimuth angle of the write head 142, and the other read head has a gap with an azimuth angle which equals the azimuth angle of the write head 144. An output of the reading unit 250 is coupled to an input of a channel decoding unit 254. The channel decoding unit may be adapted to carry out a 25-to-24 decoding on the signal read out, so as to convert 25-bit words in the incoming datastream into 24-bit words, such as disclosed in document D3. Next, an error correction is carried out in the error correction unit 258.

The error correction unit 258 is used for carrying out an error correction on the information read from the record carrier in the 'normal play' reproduction mode, on the basis of the parity information read from the portions 12b of the tracks, see FIG. 2, and the parity information stored in the portions 64b of the sync blocks, see FIG. 8. In a trick play reproduction mode, only an error correction based on the parity information stored in the portions 64b of the trick play sync blocks is (can be) carried out.

The output of the error correction unit 258 is coupled to an input 259 of a 'normal play' processing unit 260. Further, a 'trick play' processing unit 262 is provided having an input 261 also coupled to the output of the error correction unit 258. Outputs 264 and 265 of the 'normal play' processing unit 260 and the 'trick play' processing unit 262, respectively, are coupled to corresponding terminals a and b, respectively, of a switch 266, a c-terminal of which is coupled to an output terminal 268.

If the reproducing apparatus is switched into a 'normal play' reproduction mode, this means that the record carrier 140 is transported at a nominal speed, that the 'normal play' processing unit 260 is enabled, and the switch 266 is switched into the position a–c. If the reproducing apparatus is switched into a 'trick play' reproduction mode, also called 'feature mode', this means that the record carrier 140 is transported at a speed other than the nominal speed, that the 'trick play' processing unit 262 is enabled, and the switch 266 is switched into the position b–c.

For enabling a 'trick play' reproduction mode, the reproducing apparatus is further provided with a tape servo control means 270 which generates a control signal for controlling the speed of the record carrier 140. More specifically, the control means 270 generates a control signal during the 'trick play' reproduction mode for transporting the record carrier 140 such that, in the first trick play mode with the record carrier speed being +4 times the nominal reproduction speed, in accordance with FIG. 1, the read head 252 exactly crosses the tracks in accordance with the lines 24.1 and 24.2, and the read head 254 exactly crosses the tracks in accordance with the lines 26.1 and 26.2 in FIG. 1.

In the second trick play reproduction mode, with the record carrier speed being –4 times the nominal reproduction speed, the control means 270 generates a control signal such that, in accordance with FIG. 3, the read head 252 exactly crosses the tracks in accordance with the lines 30.1 and 30.2, and the read head 254 exactly crosses the tracks in accordance with the lines 32.1 and 32.2 in FIG. 3.

In the third trick play reproduction mode, with the record carrier speed being +12 times the nominal reproduction speed, the control means 270 generates a control signal such that, in accordance with FIG. 4, the read head 252 exactly crosses the tracks in accordance with the lines 37.1 and 37.2, and the read head 254 exactly crosses the tracks in accordance with the lines 36.1 and 36.2 in FIG. 4.

In the fourth trick play reproduction mode, with the record carrier speed being –12 times the nominal reproduction speed, the control means 270 generates a control signal such that, in accordance with FIG. 5, the read head 252 exactly crosses the tracks in accordance with the line 42, and the read head 254 exactly crosses the tracks in accordance with the line 44 in FIG. 5.

In the fifth trick play reproduction mode, with the record carrier speed being +24 times the nominal reproduction speed, the control means 270 generates a control signal such that, in accordance with FIG. 6, the read head 252 exactly crosses the tracks in accordance with the line 50, and the read head 254 exactly crosses the tracks in accordance with the line 51 in FIG. 6.

In the sixth trick play reproduction mode, with the record carrier speed being –24 times the nominal reproduction speed, the control means 270 generates a control signal such that, in accordance with FIG. 7, the read head 252 exactly crosses the tracks in accordance with the line 56, and the read head 254 exactly crosses the tracks in accordance with the line 58 in FIG. 7.

The record carrier transport control realized in the way explained above is named: track select transport control, in the sense that specific paths across the record carrier are selected for reproduction in a trick play reproduction mode, said paths beginning at specific tracks on the record carrier. Further, those paths are chosen such that at least one of the two read heads is capable of reading the subcode information recorded in the recording portions 4 of the tracks. In FIG. 1, this is the read head following the paths 24.1 and 24.2. The read head following the paths 26.1 and 26.2 is not capable of reading the subcode recording portions 4, as it scans the subcode recording portions of tracks having the wrong azimuth. In FIG. 3, this is the read head following the paths 30.1 and 30.2. The read head following the paths 32.1 and 32.2 is not capable of reading the subcode recording portions 4, as it scans the subcode recording portions of tracks having the wrong azimuth. In FIG. 4, this is the read head following the paths 37.1 and 37.2. The read head following the paths 36.1 and 36.2 is not capable of reading the subcode recording portions 4, as it scans the subcode recording portions of tracks having the wrong azimuth. In FIG. 5, this is the read head following the path 42. The read head following the path 44 is not capable of reading the subcode recording portions 4, as it scans the subcode recording portions of tracks having the wrong azimuth. In FIG. 6, this is the read head following the path 50. The read head following the path 51 is not capable of reading the subcode recording portions 4, as it scans the subcode recording portions of tracks having the wrong azimuth. In FIG. 7, this is the read head following the path 58. The read head following the path 56 is not capable of reading the subcode recording portions 4, as it scans the subcode recording portions of tracks having the wrong azimuth.

The reproduction in a trick play reproduction mode will now be explained in more detail. During trick play reproduction, bursts of information of 'normal play' data and bursts of information of 'trick play' data are read by the two read heads during one revolution of the head drum. Not complete 'normal play' data is ignored and, as far as complete 'normal play' sync blocks are read, those sync blocks are identified by their identifier (the bits $b_3$, $b_2$ in byte 70 equal '00', see FIG. 9), as being 'normal play' data, and thus also ignored.

As soon as a sync block is read, having a trick play speed identifier which is stored in the two remaining bits $b_7$, $b_6$ of the byte 72 in FIG. 9, which corresponds to the trick play reproduction speed in question, and further, the direction identifier identifies a trick play speed in the forward direction (the bits $b_3$, $b_2$ of the byte 72 in FIG. 9 being equal to '10'), the sync block read is detected as being a trick play sync block for the +12 times nominal reproduction mode and stored in the trick play processing unit 262 for further processing.

For the +4 times reproduction speed, as well as the −4 times reproduction speed, the parity data read from the record carrier during one revolution of the head drum, is used to carry out an ECC on the trick play data retrieved from the record carrier during that same revolution of the head drum. For the other trick play reproduction speeds the repetitions of the trick play sync blocks are used to carry out an error correction on the reproduced data.

The trick play sync block numbers for each of the trick play sync blocks can be derived from the RSB# stored in the 6 bits $b_0$ to $b_5$ of the byte 72, in the way as explained above, using the knowledge about which read head is in reproducing contact with the record carrier. When having derived the trick play sync block numbers, those numbers are used to store the trick play sync blocks in specific memory locations in a processing memory included in the processing unit 262.

It should be noted here that the use of the trick play sync block numbers is preferred over the use of the sync block numbers for storing the trick play sync blocks in the processing memory. The trick play sync block numbers directly relate to the memory locations in the said processing memory in which the trick play sync blocks are to be stored. Using the sync block numbers instead, would require a conversion table to convert the sync block numbers into the corresponding trick play sync block numbers in order to store the trick play sync blocks at their correct location in the processing memory. This conversion table thus has to be stored in the reproducing apparatus. Such conversion table, however, would prevent the recording/reproducing system described from being 'forward compatible', in the sense that, if another correspondence between sync block numbers and trick play sync block numbers were chosen in a new version of the recording/reproducing system, such would make the older system and the tapes obtained with the older system useless in the new system.

Further, by using the trick play sync block numbers, the recording of the trick play sync blocks on the record carrier becomes more flexible, as a trick play sync block having a specific trick play sync block number can be stored at a variable position in a track on the record carrier. By varying this position, the sync block number will change. The trick play sync block number will not, so that upon reproduction, irrespective of where the trick play sync block is stored in the track, it will be stored at the correct location in the processing memory. In addition, no memory space is required for storing the conversion table and for carrying out the conversion.

The trick play packets can now be retrieved from each two subsequent trick play sync blocks. The time stamps for each packet of the trick play information signal are derived from the packet header 75, see FIG. 10.

In the processing unit 262, the time stamps derived from each of the packets is compared to a reference time stamps generated by a reference time stamp counter included in the processing unit 262 with a 27 MHz frequency. Upon coincidence of the value of the time stamp of a packet with the value of the time stamp generated by the reference time stamp counter, the packet is outputted at the output 265, so as to obtain a valid MPEG transport stream at the output terminal 268. An MPEG decoder may be included in the apparatus, coupled to the terminal 286, or may be separate from the apparatus.

While the invention has been described with reference to preferred embodiments thereof, it is to be understood that these are not limitative examples. Thus, various modifications may become apparent to those skilled in the art, without departing from the scope of the invention, as defined by the claims. The first information signal thus may be another type of signal than a digital video signal and/or an audio signal, such as a data signal. Further, the trick play signal recorded in the trick play segments could be an information signal which has no relationship whatsoever with the first digital information signal. In such an embodiment, the record carrier is a recording medium on which a multiplicity of transmission channels are available for transmitting independent information signals.

Further, the invention lies in each and every novel feature or combination of features.

The advantages of the recording/reproducing system described above can be summarized as follows:

1. A fixed number of trick play sync blocks are read from the record carrier during one revolution of the head drum in a trick play reproduction mode: in the present example, 90 trick play sync blocks.
2. The format obtained enables the reading of the subcode in a trick play reproduction mode.
3. As many as possible data burst are present and divided over the two scans of both read heads in one revolution of the head drum.
4. The trick play segments are as short as possible so as to obtain a robust trick play reproduction.
5. The format is repetitive in groups of (p=) 48 tracks and is chosen such that editing can be realized, for the reason that at least one of the tracks in the group of 48 tracks is devoid of trick play information.
6. An optimal position of the segments with respect to the ideal scanning line of a reproduction head can be obtained.
7. An optimal robustness against tracking errors and missing trick play sync blocks is obtained.

It should be made very well clear that the invention should not be restricted to the specific trick play reproduction speeds described in the figure description. E.g., trick play speeds 6x, 18x and 36x in forward and backwards direction could have been chosen, combined with trick play information recorded in groups of (p=) 72 tracks. Further, the invention need not be restricted to the recording of video data. One could imagine to use the invention in an audio recording system, based on the helical scan principle, where different audio signals are record in the trick play segments for the various trick play speeds.

List of Related Documents

D1 U.S. Pat. No. 5,579,183, corresponding to EP 702,877-A2 (PHN 14.818)
D2 WO 96/30.905-A2 (PHN 15.260)
D3 U.S. Pat. No. 5,142,421 (PHN 13.537)
D4 U.S. Pat. No. 5,751,889, corresponding to WO 95/28061 (PHN 14.832)

What is claimed is:

1. An apparatus for recording a digital information signal in tracks on a record carrier, the digital information signal comprising subsequent transport packets of information, the apparatus comprising:

input means for receiving the digital information signal;

signal processing means for processing the digital information signal so as to make the digital information signal suitable for recording in said tracks, the signal processing means (a) generating sync blocks of information, each sync block comprising a first block section having a synchronization signal and a second block section having a number of information bytes of the digital information signal, and (b) storing, each time, the information included in x transport packets of the digital information signal in the second block sections of a group of y sync blocks, the second block section of at least the first sync block of the group of y sync blocks comprising a third block section for storing a time stamp;

time stamp generator means for generating a time stamp for a packet of the digital information signal, said time stamp generating means comprising counter means for generating subsequent cycles of count values;

sync block number generator means for generating sync block numbers for each of the sync blocks; and writing means for writing the sequence of sync blocks in the tracks on the record carrier, at a predetermined recording speed of the record carrier, the writing means comprising a rotatable head drum provided with at least a first and a second writing head, the digital information signal being meant for reproduction in a reproduction apparatus at a trick play speed which equals $n_1$ times said recording speed, where $n_1$ is an integer larger than 1, characterized in that the time stamp generator means generates subsequent time stamps in the form of subsequent cycles of (n'+k')-bit count values, where n' and k' are integers larger than zero, a cycle of count values coinciding, in time, with the time interval equal to $m_1$ revolutions of the head drum, the signal processing means storing a portion of a transport packet having a specific time stamp in a sync block having a specific sync block number, such that the said specific sync block number satisfies the following relationship, $$NTPSB-q_1 < ATPSB < NTPSB+q_2,$$

where ATPSB is the specific sync block number included in said sync block, and NTPSB is a nominal sync block number having the following relationship with said specific time stamp:

$$NTPSB = \text{int}((k+n/N) \cdot q/M),$$

where k is the decimal value corresponding to the binary value of the k' most significant bits of the count value corresponding to said specific time stamp, and n is the decimal value corresponding to the binary value of the n' least significant bits of the count value of the said specific time stamp, N and M being positive integers, and q being an integer for which holds $q \geq q_1+q_2$.

2. The recording apparatus as claimed in claim 1, characterized in that the writing means writes q sync blocks in a group of p successive tracks on the record carrier, enabling reading, by said reproduction apparatus having a head drum, of q sync blocks during one revolution of the head drum, upon reproduction with said reproduction apparatus at said first trick play speed equal $n_1$ times the recording speed.

3. The recording apparatus as claimed in claim 1, characterized in that $n_1=m_1=4$.

4. The recording apparatus as claimed in claim 1, characterized in that $n_1=m_1=12$.

5. The recording apparatus as claimed in claim 1, characterized in that $n_1=m_1=24$.

6. The recording apparatus as claimed in claim 1, characterized in that N equals the period of n and M equals the period of k.

7. The recording apparatus as claimed in claim 6, characterized in that n'=18 and k'=2.

8. The recording apparatus as claimed in claim 7, characterized in that N equals 225,000 when the head drum rotates at a speed of 1800 rpm, or equals 225,225 when the head drum rotates at a speed of 1800/1.001 rpm.

9. The recording apparatus as claimed in claim 7, characterized in that M equals 4.

10. The recording apparatus as claimed in claim 1, characterized in that the sync block number generator means generates subsequent cycles of q sync block numbers, one cycle of q sync block numbers being generated during said $m_1$ revolutions of the head drum.

11. The recording apparatus as claimed in claim 1, characterized in that x=1 and y=2.

12. The recording apparatus as claimed in claim 1, characterized in that q=90.

13. The recording apparatus as claimed in claim 12, characterized in that $q_1=q_2=45$.

14. A method of recording a digital information signal in tracks on a record carrier, the digital information signal comprising subsequent transport packets of information, the method comprising the steps:

receiving the digital information signal;

processing the digital information signal so as to make the digital information signal suitable for recording in said tracks, the signal processing step comprising the substeps:

(a) generating sync blocks of information, each sync block comprising a first block section which comprises a synchronization signal and a second block section comprising a number of information bytes of the digital information signal, and (b) storing, each time, the information included in x transport packets of the digital information signal in the second block sections of a group of y sync blocks, the second block section of at least the first sync block of the group of y sync blocks comprising a third block section for storing a time stamp;

generating time stamps for packets of the digital information signal, and thereto generating subsequent cycles of count values;

generating sync block numbers for each of the sync blocks; and writing the sequence of sync blocks in the tracks on the record carrier, at a predetermined recording speed of the record carrier, the digital information signal being meant for reproduction in a reproduction apparatus at a trick play speed which equals $n_1$ times said recording speed, where $n_1$ is an integer larger than 1, characterized in that said step of generating time stamps comprises:

generating subsequent cycles of (n'+k')-bit count values, where n' and k' are integers larger than zero, a cycle of count values coinciding in time with the time interval equal to $m_1$ revolutions of the head drum, that said signal processing step includes storing a portion of a transport packet having a specific time stamp in a sync block having a specific sync block number, such that said sync block number satisfies the following relationship, $$NTPSB-q_1 < ATPSB < NTPSB+q_2,$$

where ATPSB is the specific sync block number included in the said sync block, and NTPSB is a nominal sync block number, which has the following relationship with said specific time stamp:

$$NTPSB = \text{int}((k+n/N) \cdot q/M),$$

where k is the decimal value corresponding to the binary value of the k' most significant bits of the count value corresponding to said specific time stamp, and n is the decimal value corresponding to the binary value of the n' least significant bits of the count value of the said specific time stamp, N and M being positive integers and q being an integer for which holds $q \geq q_1 + q_2$.

* * * * *